United States Patent
Jovicic et al.

(10) Patent No.: US 10,506,542 B2
(45) Date of Patent: Dec. 10, 2019

(54) METHODS AND APPARATUS FOR USING MOBILE DEVICES AS LOCATION ANCHOR POINTS

(75) Inventors: Aleksandar Jovicic, Jersey City, NJ (US); Thomas Richardson, South Orange, NJ (US); Cyril Measson, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1413 days.

(21) Appl. No.: 12/875,338

(22) Filed: Sep. 3, 2010

(65) Prior Publication Data

US 2012/0058733 A1    Mar. 8, 2012

(51) Int. Cl.
| | |
|---|---|
| *H04W 64/00* | (2009.01) |
| *G01S 5/00* | (2006.01) |
| *G01S 13/87* | (2006.01) |
| *H04W 88/04* | (2009.01) |
| *H04W 76/14* | (2018.01) |

(52) U.S. Cl.
CPC ........... *H04W 64/00* (2013.01); *G01S 5/0027* (2013.01); *G01S 13/878* (2013.01); *H04W 76/14* (2018.02); *H04W 88/04* (2013.01)

(58) Field of Classification Search
CPC ............................. H04W 8/005; H04B 7/0421
USPC .......................................................... 455/500
See application file for complete search history.

(56) References Cited

U.S. PATENT DOCUMENTS

| | | |
|---|---|---|
| 8,082,303 B2 | 12/2011 | Laroia et al. |
| 8,493,887 B2 | 7/2013 | Palanki et al. |
| 8,521,893 B2 | 8/2013 | Park et al. |

(Continued)

FOREIGN PATENT DOCUMENTS

| | | |
|---|---|---|
| JP | 2013522970 A | 6/2013 |
| JP | 2013530607 A | 7/2013 |

(Continued)

OTHER PUBLICATIONS

International Search Report and Written Opinion—PCT/US2011/050414—ISA/EPO—dated Nov. 22, 2011.

(Continued)

*Primary Examiner* — Ankur Jain
(74) *Attorney, Agent, or Firm* — Kilpatrick Townsend & Stockton, LLP

(57) ABSTRACT

Mobile devices are used as temporary location anchor points, e.g., to supplement fixed location permanent location anchor points, in a wireless communications system in which mobile device locations are determined. A mobile device receives a command or request to operate as a location anchor point. In some embodiments, the command includes time information indicating the amount of time the mobile device is to operate as a location anchor point. In some embodiments, a mobile device operating as a location anchor point reports a received signal strength measurement along with information identifying the device from which the signal was received to a network element, e.g., a location server node. In some embodiments, a mobile device operating as a location anchor point broadcasts a signal providing location information. The mobile device receives compensation for operating as a location anchor point. Compensation may be monetary, services, or benefits provided by the network.

20 Claims, 20 Drawing Sheets

(56) References Cited

U.S. PATENT DOCUMENTS

| | | |
|---|---|---|
| 2004/0259567 A1 | 12/2004 | Valko et al. |
| 2005/0221829 A1* | 10/2005 | Nishida .............. G01S 11/06 455/440 |
| 2006/0233134 A1* | 10/2006 | Cromer ............... H04W 28/22 370/329 |
| 2007/0135150 A1* | 6/2007 | Ushiki et al. ............... 455/509 |
| 2007/0237096 A1 | 10/2007 | Vengroff et al. |
| 2008/0037499 A1* | 2/2008 | Kumar et al. ............... 370/342 |
| 2008/0108336 A1 | 5/2008 | Venkatachalum et al. |
| 2008/0205308 A1 | 8/2008 | Prehofer et al. |
| 2009/0279522 A1 | 11/2009 | Leroy et al. |
| 2009/0323648 A1* | 12/2009 | Park et al. ............... 370/338 |
| 2010/0085907 A1* | 4/2010 | Yasumoto ............... 370/315 |
| 2010/0157941 A1* | 6/2010 | Raghothaman ....... H04W 36/30 370/331 |
| 2010/0169498 A1 | 7/2010 | Palanki et al. |
| 2011/0098057 A1 | 4/2011 | Edge et al. |
| 2011/0177805 A1* | 7/2011 | Maki et al. ............... 455/422.1 |

FOREIGN PATENT DOCUMENTS

| | | |
|---|---|---|
| WO | 9904582 A1 | 1/1999 |
| WO | 9914965 A1 | 3/1999 |
| WO | 0069199 A1 | 11/2000 |
| WO | WO-2007056738 A2 | 5/2007 |
| WO | 2007146818 A2 | 12/2007 |
| WO | 2009058068 | 5/2009 |
| WO | WO-2009158663 A1 | 12/2009 |
| WO | WO-2010078271 A2 | 7/2010 |
| WO | WO-2010078273 A2 | 7/2010 |
| WO | WO-2010117627 A2 | 10/2010 |
| WO | WO-2010124011 A2 | 10/2010 |
| WO | WO-2011112849 A1 | 9/2011 |
| WO | WO-2011140435 A1 | 11/2011 |

OTHER PUBLICATIONS

Ou C., et al., "Sensor Position Determination with Flying Anchors in Three-Dimensional Wireless Sensor Networks", IEEE Transactions on Mobile Computing, IEEE Service Center, Los Alamitos, CA, US, vol. 7, No. 9, Sep. 1, 2008 (Sep. 1, 2008), pp. 1084-1097, XP011335275, ISSN: 1536-1233, DOI: 10.1109/TMC.2008.39 2.1 Mobile beacons 3.1. System Environment and Assumptions.

* cited by examiner

METHODS AND APPARATUS FOR USING MOBILE DEVICES AS LOCATION ANCHOR POINTS

FIELD

Various embodiments relate to wireless communications, and more particularly, to methods and apparatus related to locating mobile devices.

BACKGROUND

Determining the location of a mobile communications device is useful in providing a wide variety of services. For example, current device location information can be useful in providing and/or obtaining services relating to discovery of other peers in a geographic area, discovery of services and/or other information sources which may be of interest in a geographic area visited by a mobile device.

Various methods exist for determining the location of a mobile device from signals transmitted from location anchor points, e.g., access points at known locations, or from signals received by the location anchor point, e.g., signals received by an access point from a mobile wireless terminal. Unfortunately, access points are often located in places within buildings or at other locations for reasons unrelated to their usefulness in serving as a location anchor point. Such reasons often include the location of pre-exiting wiring, a wall or other structure on which to mount the access point and/or for other reasons relating to available space for the access point or existing infrastructure which can be used by the access point.

As a result, buildings and/or other sites often do not include access points which can serve as location anchor points at one or more locations where it would be desirable to have a location anchor point for the purpose of facilitating accurate determination of mobile device location at the site.

In view of the above discussion, it should be appreciated that there is a need for improved location anchor point placement and/or distribution in a building and/or other site.

SUMMARY

Mobile devices, whose location is known with reasonable certainty, are, in some embodiments, instructed, e.g., by a network element used to track or determine mobile device location, to operate as temporary location anchor points when it is determined that they are in a location where it is desirable to have an additional location anchor point.

A mobile device receiving an instruction to act as a mobile anchor point operates as a location anchor point in accordance with the received instruction. The instruction may specify the amount of time the mobile device is to act as a location anchor point. Since such operation normally involves transmitting of signals which the mobile device would not otherwise transmit, the mobile device is subject to power consumption and/or other negative effects resulting from its use as a location anchor point. For its services as a location anchor point the mobile device may be compensated. The compensation may be monetary or in the form of services or benefits provided by the network. For example, the mobile device may be rewarded with a higher level of QoS for a period of time based on the amount of time it serves as a location anchor point or provided some other service for which the user of the mobile device has not paid.

Serving as a location anchor point may include receiving signals from mobile devices in the area of the mobile device acting as the location anchor point, measuring received signal strength, and reporting the receipt of signals, their received signal strength, and information identifying the mobile or mobiles from which the signals are received to said network element which determines and tracks the location of mobile devices in the network.

In other embodiments where device location is determined by individual mobile devices, the mobile device operating as the temporary location anchor point may transmit signals indicating the location of the mobile device serving as the temporary location anchor point. A device receiving the signals can determine from the signal strength the approximate distance from the indicated location of the temporary location anchor point and combine the information with information determined from other location anchor points to determine its location more accurately than would be possible without the signal from the temporary location anchor point.

An exemplary method of operating a mobile device at a known location, in accordance with some embodiments, comprises: receiving a command instructing the mobile device to operate as a location anchor point; and in response to receiving said command, operating as a location anchor point. An exemplary mobile device, in accordance with some embodiments, comprises: at least one processor configured to: receive a command instructing the mobile device to operate as a location anchor point; and control said mobile device to operate as a location anchor point in response to receiving said command. The exemplary mobile device further comprises memory coupled to said at least one processor.

An exemplary method of operating a mobile device, in accordance with some embodiments, comprises: receiving a set of locations at which the mobile device may operate as a location anchor point; determining a current location of the mobile device; determining if said current location of the mobile device is in a neighborhood of at least one of the locations in the received set of locations; and operating as a location anchor point while said mobile device is in the neighborhood of at least one of the locations in the received set of locations. An exemplary mobile device, in accordance with some embodiments, comprises: at least one processor configured to: receive a set of locations at which the mobile device may operate as a location anchor point; determine a current location of the mobile device; determine if said current location of the mobile device is in a neighborhood of at least one of the locations in the received set of locations; and operate as a location anchor point while said mobile device is in the neighborhood of at least one of the locations in the received set of locations. The exemplary mobile device further comprises memory coupled to said at least one one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
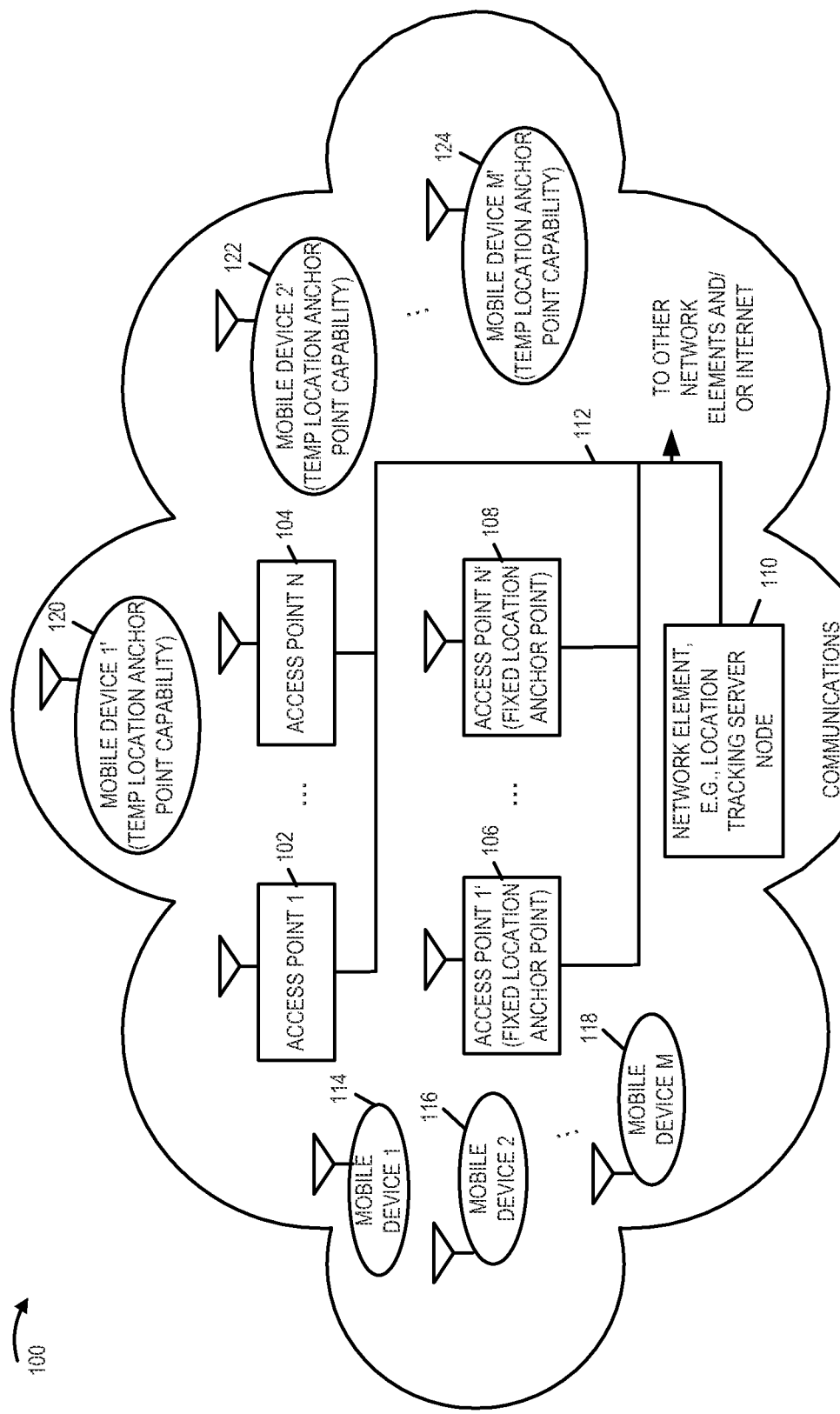
FIG. 1 is a drawing of an exemplary communications system, e.g., a wireless communications system, in accordance with an exemplary embodiment.

FIG. 1 is a drawing of an exemplary communication system 100, e.g. a wireless communications system, in accordance with an exemplary embodiment. Exemplary communications system 100 includes a plurality of access points (access point 1 102, . . . , access point N 104) which do not serve as location anchor points, a plurality of access points (access point 1' 106, . . . , access point N' 108) which serve as fixed location anchor points and a network element 110, e.g., a location tracking server node 110, which are coupled together via a backhaul network 112. The backhaul network is also coupled to other network elements and/or the Internet.

Exemplary communications system 100 also includes a plurality of mobile devices, e.g., mobile wireless terminals, which do not include the capability to serve as a temporary location anchor point (mobile device 1 114, mobile device 2 116, . . . , mobile device M 118. Exemplary communications system 100 also includes a plurality of mobile devices, e.g., mobile wireless terminals, which can and sometimes do, serve a temporary location anchor points (mobile device 1' 120, mobile device 2' 122, . . . mobile device M' 124).

Figure 2:
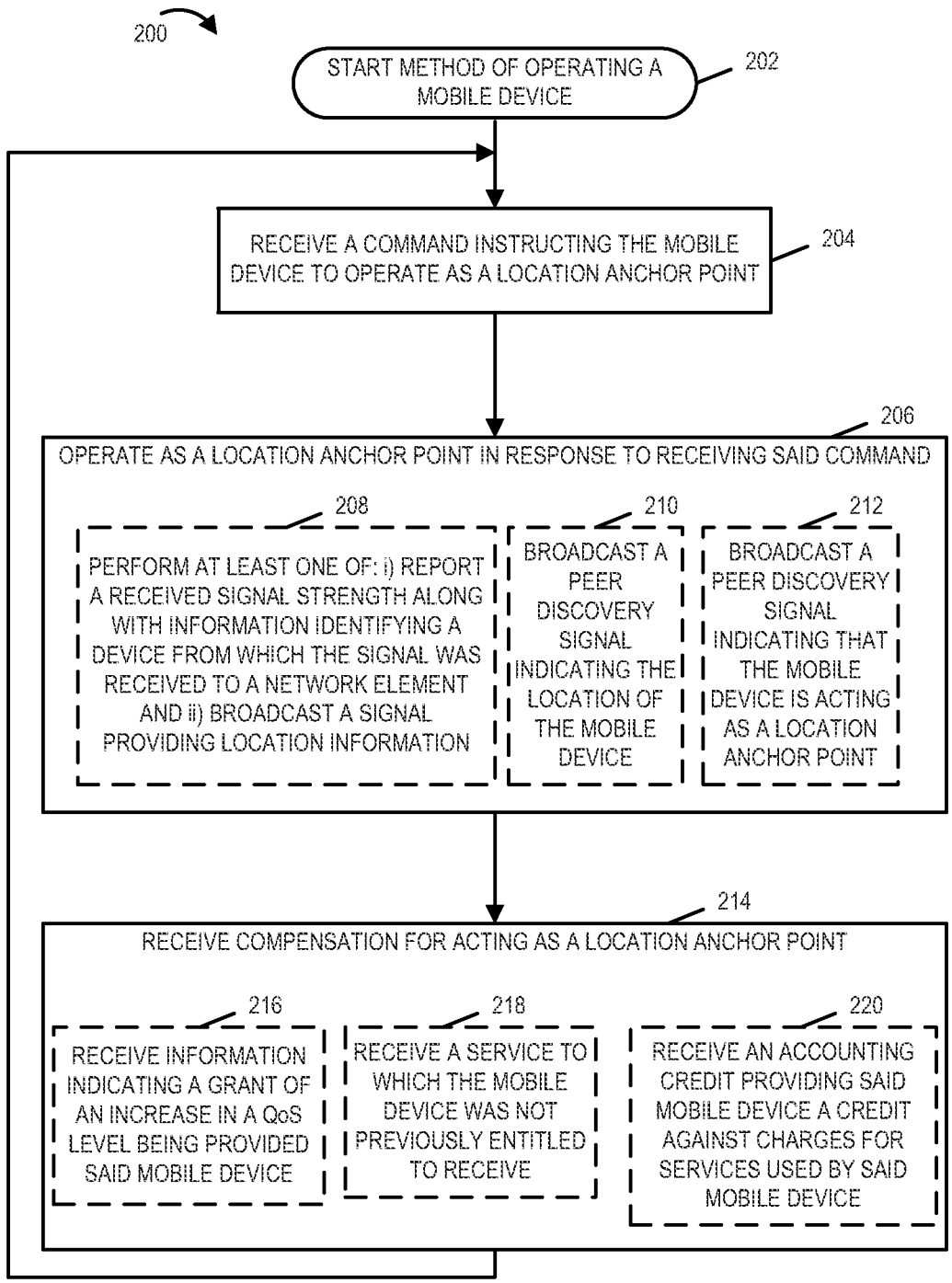
FIG. 2 is a flowchart illustrating exemplary methods of operating a mobile device, e.g., a mobile wireless terminal including the capability to act as a temporary location anchor point, in accordance with various exemplary embodiments.

FIG. 2 is a flowchart 200 of an exemplary method of operating a mobile device, e.g., a mobile wireless terminal, in accordance with an exemplary embodiment. The mobile device is, e.g., one of the mobile devices (mobile device 1', mobile device 2' 122, . . . , mobile device M' 124) of communications system 100 of FIG. 1 which includes the capability to serve as a temporary location anchor point. The mobile device is at a known location. The mobile device's location may be determined by the mobile device or by another external device, e.g., an access point or a location server node. In some embodiments, the mobile device determines its location based on received signals, e.g., received signals compared to an RF prediction map. In some embodiments, the mobile device determines its location from received signals from one or more devices at known locations, e.g., received reference signals from a plurality of location anchor points. In some embodiments, the mobile device determines its location based on user input, e.g., the user enters input identifying that the mobile device is currently at a particular known location, e.g., the office cubicle of the user or a particular conference room. In some embodiments, a network element, e.g., a location tracking server node, determines a location of a mobile device based on forwarded measurements of received mobile device transmission signals which were detected at multiple locations, e.g., by location anchor points.

Operation of the exemplary method starts in step 202, where the mobile device is powered on and initialized and proceeds to step 204. In step 204 the mobile device receives a command instructing the mobile device to operate as a location anchor point. In some embodiments, the command includes time information indicating an amount of time the mobile device is to operate as a location anchor point. Operation proceeds from step 204 to step 206.

In step 206 the mobile device, in response to receiving said command in step 204, operates as a location anchor point. In some embodiments, the mobile device performs one or more or all of steps 208, 210 and 212 as part of operating as a location anchor point. In step 208 the mobile device performs at least one of: i) reporting a received signal strength along with information identifying a device from which the signal was received to a network element and ii) broadcasting a signal providing location information. In step 210 the mobile device broadcasts a peer discovery signal indicating the location of the mobile device. In step 212 the mobile device broadcasts a peer discovery signal indicating the mobile device is acting as a location anchor point.

Operation proceeds from step 206 to step 214. In step 214 the mobile device receives compensation for acting as a location anchor point. In various embodiments, step 214 includes one or more or all of: steps 216, 218 and 220. In step 216 the mobile device receives information indicating a grant of an increase in a QoS level being provided said mobile device. In step 218 the mobile device receives a service to which the mobile device was not previously entitled to receive. In step 220 the mobile device receives an accounting credit providing said mobile device a credit against charges for service used by said mobile device.

In some embodiments, the mobile device ceases operating as a location anchor point when the mobile device determines that it has operated as a location anchor point for the length of time indicated in the received command of step 204. Operation proceeds from step 214 to step 204, where the mobile device may again receive a command to operate as a location anchor point.

Figure 3:
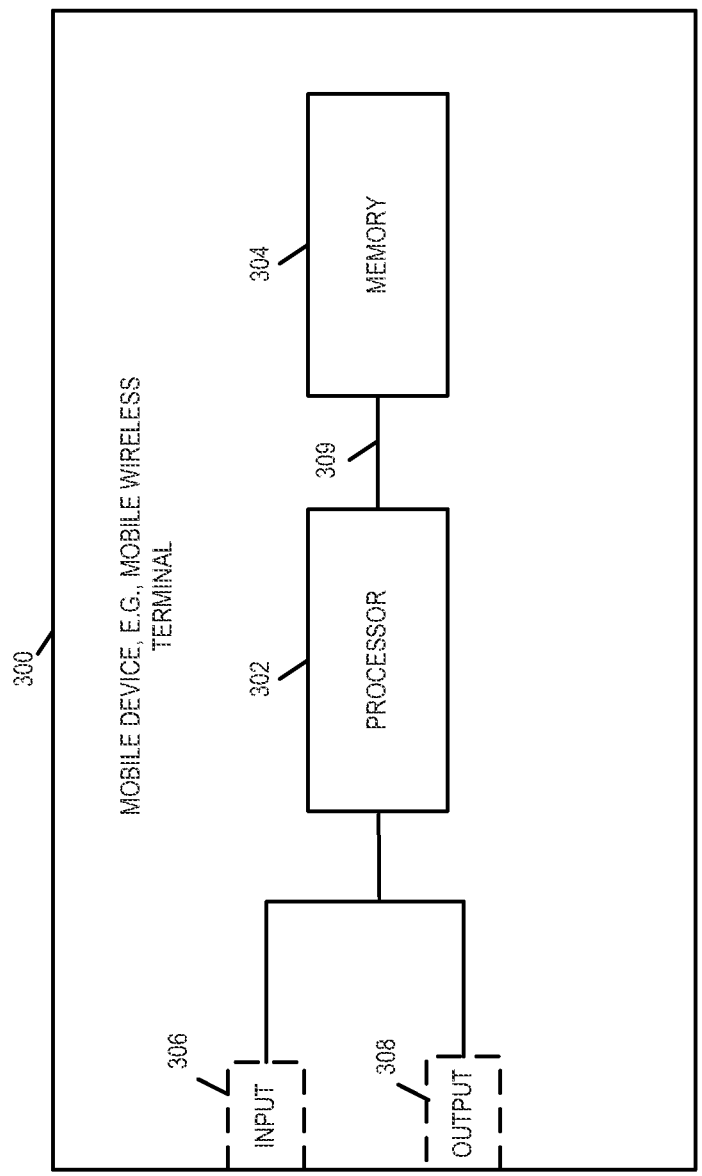
FIG. 3 is a drawing of an exemplary mobile device in accordance with an exemplary embodiment.

FIG. 3 is a drawing of an exemplary mobile device, e.g., a mobile wireless terminal, in accordance with an exemplary embodiment. Exemplary mobile device 300 is, e.g., one of the mobile devices including the capability to serve as a temporary location anchor point (120, 122, . . . 124') of system 100 of FIG. 1. Exemplary mobile device 300 may, and sometimes does, implement a method in accordance with flowchart 200 of FIG. 2.

Mobile device 300 includes a processor 302 and memory 304 coupled together via a bus 309 over which the various elements (302, 304) may interchange data and information. Mobile device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output.

Processor 302 is configured to: receive a command instructing the mobile device to operate as a location anchor point and control said mobile device to operate as a location anchor point, in response to receiving said command. In some embodiments, the received command includes time information indicating an amount of time the mobile device is to operate as a location anchor point.

In some embodiments, processor 302 is configured to perform at least one of: i) reporting a received signal strength along with information identifying a device from which the signal was received to a network element; and ii) broadcasting a signal providing location information, as part of being configured to control said mobile device to operate as a location anchor point. In some embodiments, processor 302 is configured to broadcast a peer discovery signal indicating the location of the mobile device, as part of being configured to control said mobile device to operate as a location anchor point. In various embodiments, processor 302 is configured to broadcast a peer discovery signal indicating that the mobile device is acting as a location anchor point, as part of being configured to control said mobile device to operate as a location anchor point.

In some embodiments processor 302 is further configured to: receive compensation for acting as a location anchor point. In some such embodiments, processor 302 is configured to: receive information indicating a grant of an increase in a QoS level being provided said mobile device, as part of being configured to receive compensation for acting as a location anchor point include. In some embodiments, processor 302 is configured to receive a service to which the mobile device was not previously entitled to receive, as part of being configured to receive compensation for acting as a location anchor point includes. In various embodiments, processor 302 is configured to receive an accounting credit providing said mobile device a credit against charges for services used by said mobile device, as part of being configured to receive compensation for acting as a location anchor point.

Figure 4:
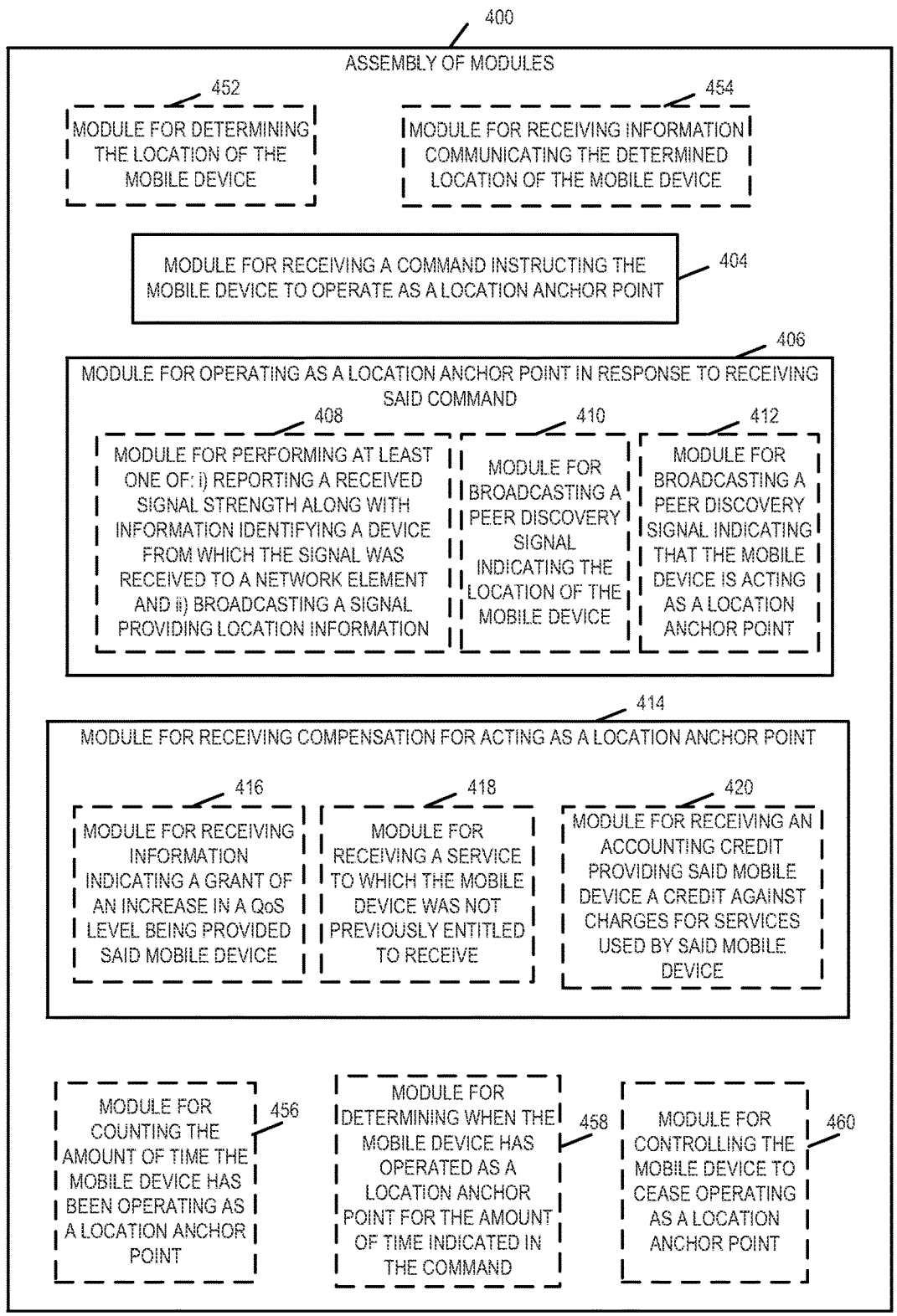
FIG. 4 is an assembly of modules which may be used in the exemplary mobile device of FIG. 3.
Figure 5:
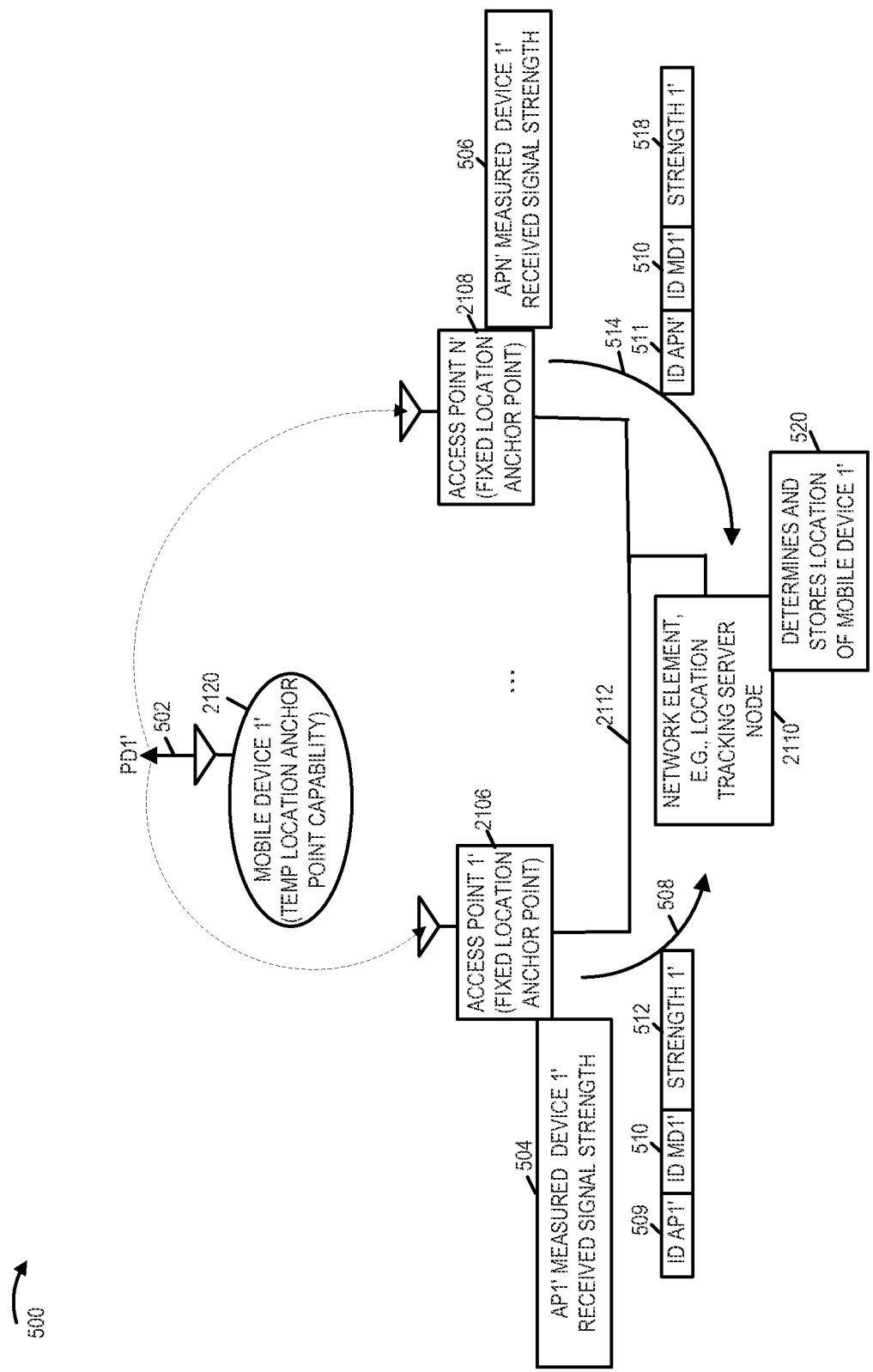
FIG. 5 is a drawing illustrating a mobile device's position being determined based on received signals from the mobile device which were detected and measured by two fixed location anchor points.

FIG. 4 is an assembly of modules 400 which can, and in some embodiments is, used in the mobile device 300 illustrated in FIG. 3. The modules in the assembly 400 can be implemented in hardware within the processor 302 of FIG. 3, e.g., as individual circuits. Alternatively, the modules may be implemented in software and stored in the memory 304 of the mobile device 300 shown in FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the mobile device 300 or elements therein such as the processor 302, to perform the functions of the corresponding steps illustrated and/or described in the method of flowchart 200 of FIG. 2.

Assembly of modules 400 includes a module 404 for receiving a command instructing the mobile device to operate as a location anchor point, a module 406 for operating as a location anchor point in response to receiving said command, and a module 414 for receiving compensation for acting as a location anchor point. In some embodiments, the command includes time information indicating an amount of time the mobile device is to operate as a location anchor point.

In some embodiments, module 406 includes one or more or all of: a module 408 for performing at least one of: i) reporting a received signal strength along with information identifying a device from which the signal was received to a network element and ii) broadcasting a signal providing location information, a module 410 for broadcasting a peer discovery signal indicating the location of the mobile device, and a module 412 for broadcasting a peer discovery signal indicating that the mobile device is acting as a location anchor point. In various embodiments, module 414 includes one or more or all of: a module 416 for receiving information indicating a grant of an increase in a QoS level being provided said mobile device, a module 418 for receiving a service to which the mobile device was not previously entitled to receive, and a module 420 for receiving an accounting credit providing said mobile device a credit for services used by said mobile device.

In some embodiments, assembly of modules 400 includes one or more of: a module 452 for determining the location of the mobile device and a module 454 for receiving information communicating the location of the mobile device. In various embodiments, assembly of modules 400 includes one of more or all of: a module 456 for counting the amount of time the mobile device has been operating as a location anchor point, a module 458 for determining when the mobile device has operated as a location anchor point for the amount of time indicated in the received command instructing the mobile device to operate as a location anchor point, and a module 460 for controlling the mobile device to cease operating as a location anchor point, e.g., when module 458 determines that the mobile device has operated as a location anchor point for the amount of time indicated in the received command.

FIGS. 5-11 illustrate an example, in which a mobile device at a known location is commanded to and operates as a temporary location anchor point. In drawing 500 of FIG. 5 mobile device 1' 2120, which includes the capability to operate as a temporary location anchor point, transmits peer discovery signal PD1' 502. Access point 1' 2106 and access point N' 2108 are coupled to network element 2110 via backhaul network 2112. Access point 1' 2106 and access point N' 2108 are operating as fixed location anchor points. Network element 2110 is, e.g., a location tracking server node, which tracks the location of mobile devices. Mobile device 1' 2120 is, e.g., mobile device 1' 120 of system 100 of FIG. 1; access point 1' 2106 is, e.g., access point 1' 106 of system 100 of FIG. 1; access point N' 2108 is, e.g., access point N' 108 of system 100 of FIG. 1; network element 2110 is, e.g., network element 110 of system 100 of FIG. 1; and backhaul network 2112 is, e.g., backhaul network 112 of system 100 of FIG. 1.

Access point 1' 2106 receives signal PD1' 502 and measures the received signal strength as indicated by box 504. Access point 1' 2106 generates and transmits signal 508 to network element 2110 which communicates information ID AP1' 509 identifying the device which performed the measurement, information ID MD 1' 510 identifying the device which transmitted the measured signal, and strength 1' 512 reporting the received signal strength measurement. Access point N' 2108 receives signal PD1' 502 and measures the received signal strength as indicated by box 506. Access point N' 2108 generates and transmits signal 514 to network element 2110 which communicates information ID APN' 511 identifying the device which performed the measurement, information ID MD 1' 510 identifying the device from which transmitted the signal which was measured, and strength 1' 518 reporting the received signal strength measurement. Network element 2110 receives signals 508 and 514. Network element 2110 uses the information communicated in signal 508 and 514 to determine the location of mobile device 1' 2120. Network element 2110 stores the location of mobile device 1 2120 as indicated by box 520.

Figure 6:
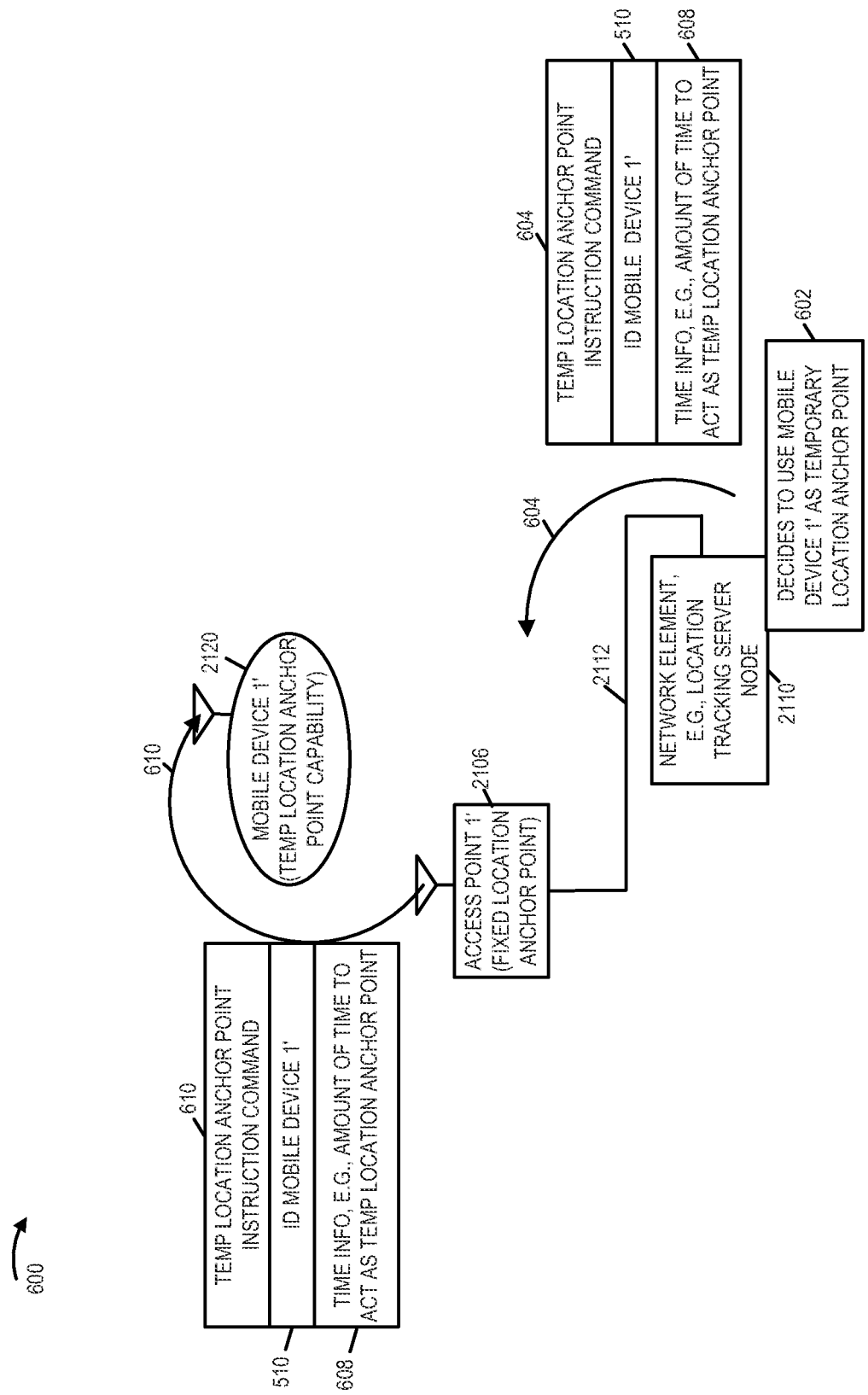
FIG. 6 is a drawing illustrating a mobile device being commanded to operate as a location anchor point.

In drawing 600 of FIG. 6, network element 2110 decides to use mobile device 1' 2120 as a temporary location anchor point as indicated by box 602. Network element 2110 generates and transmits temporary location anchor point instruction command signal 604. The temporary location anchor point instruction instructs mobile device 1' 2120 to operate as a location anchor point. Temporary location anchor point instruction command 604 includes information 510 identifying mobile device 1' as the device being commanded to operate as a location anchor point and time information 608, e.g., information indicating an amount of time mobile device 1' is to operate as a location anchor point. Signal 604 is communicated from network element 2110 to access point 1' 2106 via backhaul network 2112. Access point 1' 2106 transmits temporary location anchor point instruction command signal 610 over the air to mobile device 1' 2120. Temporary location anchor point instruction command 610 includes information 510, 608. Mobile device 1' 2120 received temporary location anchor point instruction command 610 and transitions to operate as a location anchor point.

Figure 7:
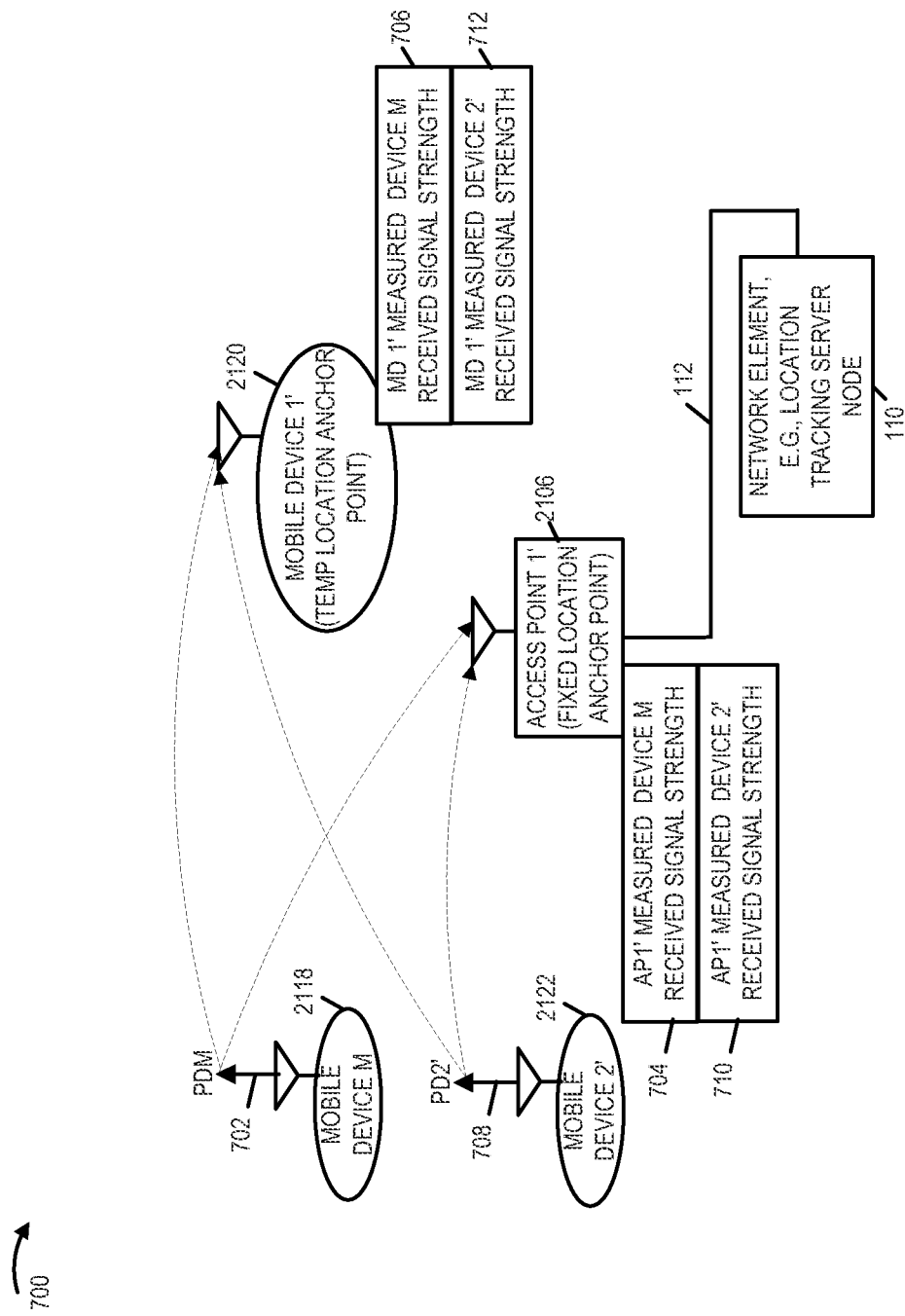
FIG. 7 is a drawing illustrating that devices, which are operating as a location anchor points, are receiving and measuring peer discovery signals from mobile devices.

In drawing 700 of FIG. 7 mobile device 1' 2120 is operating as a temporary location anchor point in response to received command 610. Mobile device 2' 2122 is transmitting its peer discovery signal PD2' 708. Mobile device M 2118 is transmitting its peer discovery signal PDM 702. Mobile device 2' 2122 is, e.g., mobile device 2' 122 of system 100 of FIG. 1; mobile device M 2118 is, e.g., mobile device M 118 of system 100 of FIG. 1.

Mobile device 1' 2120, which is now serving as a location anchor point, receives signal PDM 702 and measures the received signal strength as indicated by block 706. Mobile device 1' 2120, which is now serving as a location point, also receives signal PD2' 708 and measures the received signal strength as indicated by block 712. Access point 1' 2106, which is a fixed location anchor point, receives signal PDM 702 and measures the received signal strength as indicated by block 704. Access point 1' 2106, which is a fixed location anchor point, receives signal PD2' 708 and measures the received signal strength as indicated by block 710.

Figure 8:
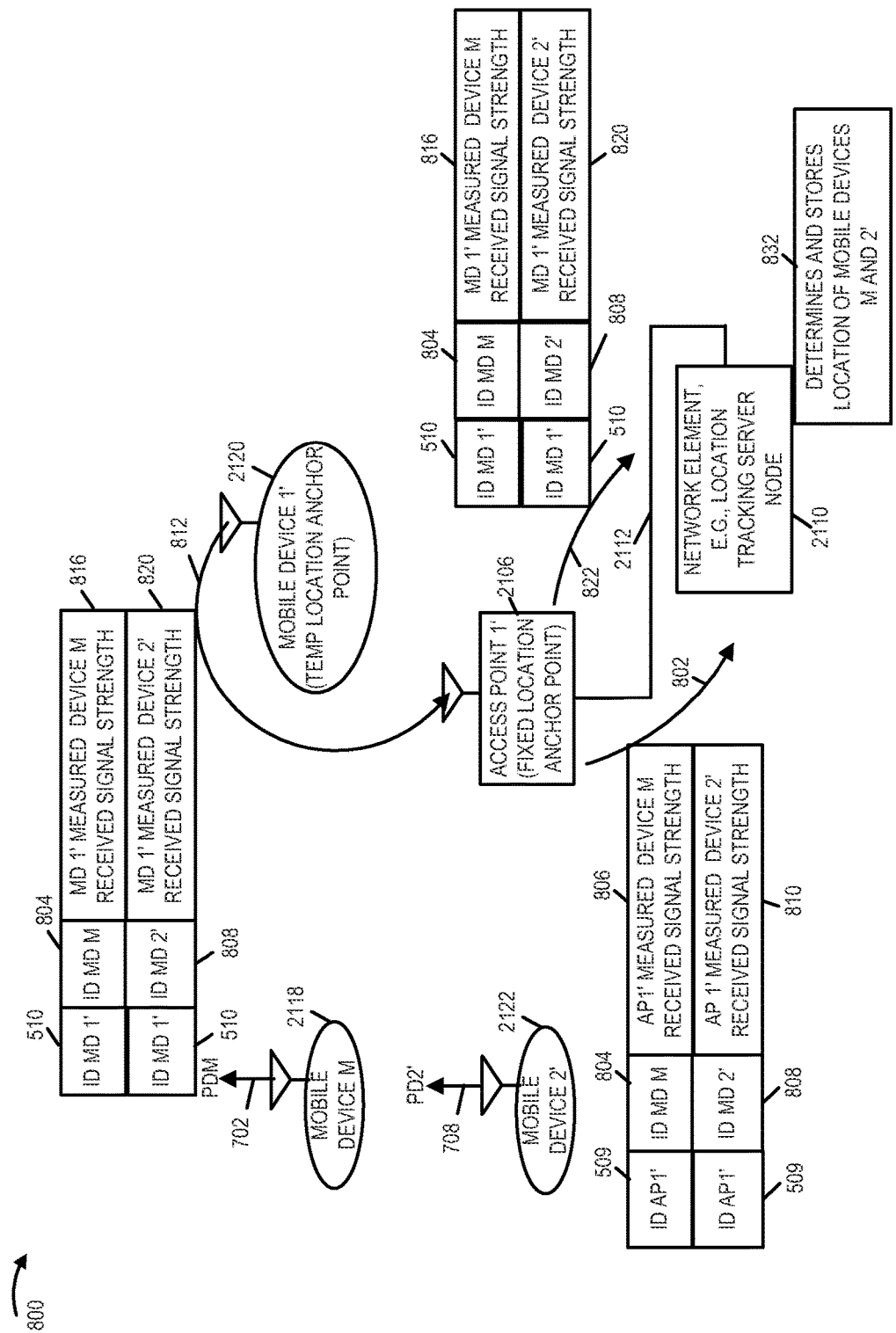
FIG. 8 is a drawing illustrating that devices which are operating as location anchor points are communicating received signal measurement information to a network node which determines mobile device locations.

In drawing 800 of FIG. 8, access point 1' 2106 generates and transmits signal 802 over backhaul network 2112 to network element 2110 communicating received signal strength measurements, information identifying the mobile devices which transmitted the signals which were measured, and information identifying the device which measured the signals. Signal 802 includes information 509 identifying AP 1' as the measuring device, information 804 identifying mobile device M as the device which transmitted the measured signal, and corresponding information 806 communicating the received signal strength of signal PDM 702 as measured by access point 1' 2106. Signal 802 also includes information 509 identifying AP 1' as the measuring device, information 808 identifying mobile device 2' as the device which transmitted the measured signal, and corresponding information 810 communicating the received signal strength of signal PD2' 708 as measured by access point 1' 2106.

In drawing 800 of FIG. 8, mobile device 1' 2120 generates and transmits signal 812 over the air to access point 1' 2106 communicating received signal strength measurements, information identifying the mobile devices which transmitted the signals which were measured, and information identifying the device which measured the signals. Signal 812 includes information 510 identifying mobile device 1' as the device which performed the measurement, information 804 identifying mobile device M as the device which transmitted the signal which was measured and corresponding information 816 communicating the received signal strength of signal PDM 702 as measured by mobile device 1' 2120. Signal 812 also includes information 510 identifying mobile device 1' as the device which performed the measurement, information 808 identifying mobile device 2' as the device which transmitted the signal which was measured, and corresponding information 820 communicating the received signal strength of signal PD2' 708 as measured by mobile device 1' 2120. Access point 1' 2106 receives signal 816 and generates signal 822 communicating information ((510, 804, 816), (510, 808,820)) to network element 2110 via backhaul network 2112.

Network element 2110 receives signals 802 and 822 and uses the information communicated in signals 802 and 822 to determine the location of mobile device M 2118 and the location of mobile device 2' 2122. Network element 2110 stores the determined locations of mobile device M and mobile device 2' as indicted by box 832.

Figure 9:
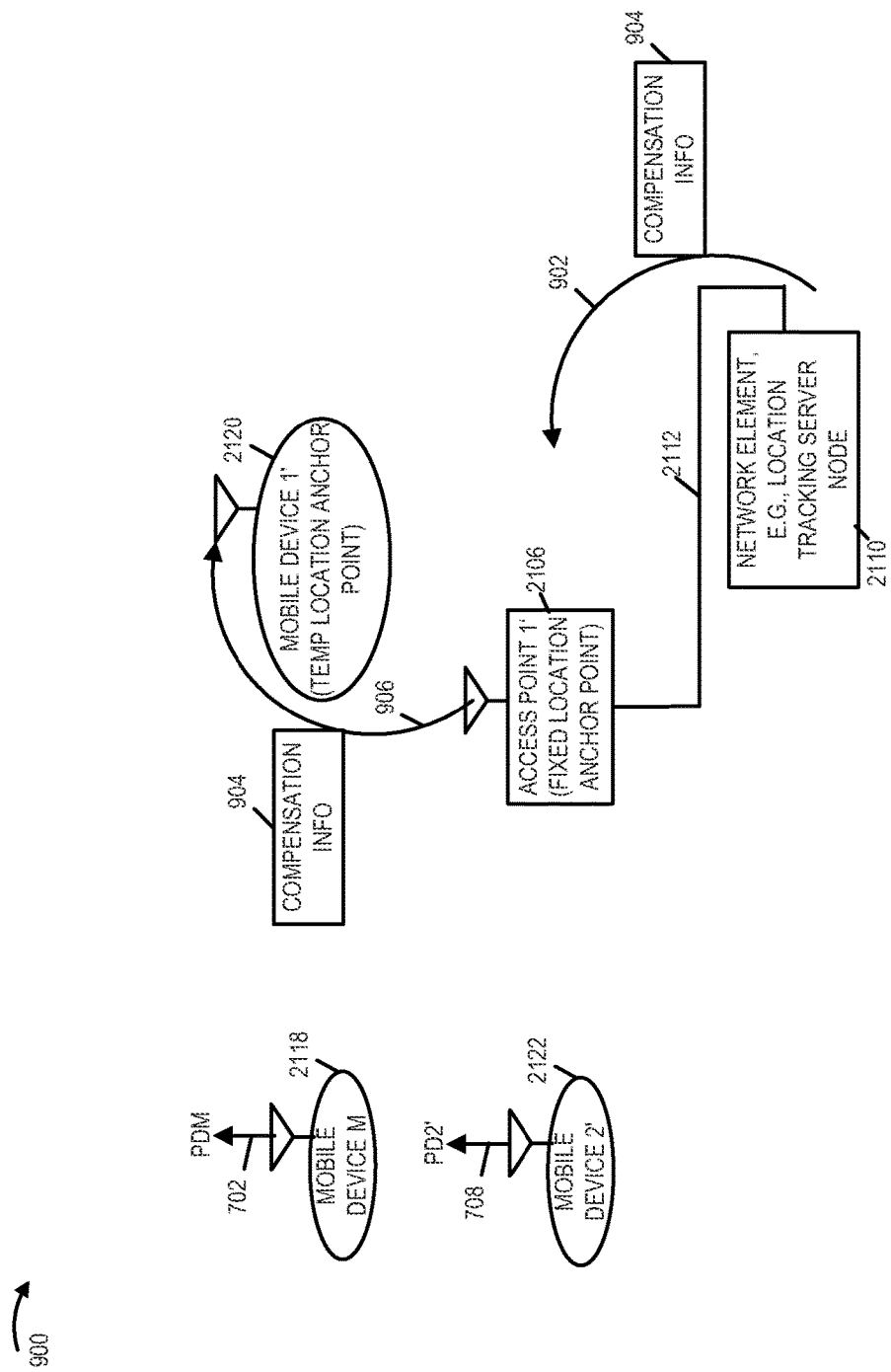
FIG. 9 is a drawing illustrating that a mobile device which has operated temporarily as a location anchor point receives compensation for operating as a location anchor point.

In drawing 900 of FIG. 9, network element 2110 generates signal 902 communicating compensation information 904 identifying the compensation mobile device 1' 2120 is to receive for acting as a location anchor point. Signal 902 is communicated via backhaul network 2112 from network element 2110 to access point 1' 2106. Access point 1' 2106 generates signal 906, which it transmits over the air to mobile device 1' 2120 communicating compensation information 904. Mobile device 1' 2120 receives signal 906 and receives the compensation for acting as a location anchor point. In some embodiments, mobile device 1' 2120 receives information indicating a grant of an increase in a QoS level being provided to mobile device 1' 2120 as compensation for acting as a location anchor point. In some embodiments, mobile device 1' 2120 receives a service to which mobile device 1' 2120 was not previously entitled to receive as compensation for acting as a location anchor point. In some embodiments, mobile device 1' 2120 receives an accounting credit providing mobile device 1' 2120 a credit against charges for services used by mobile device 1' 2120.

Figure 10:
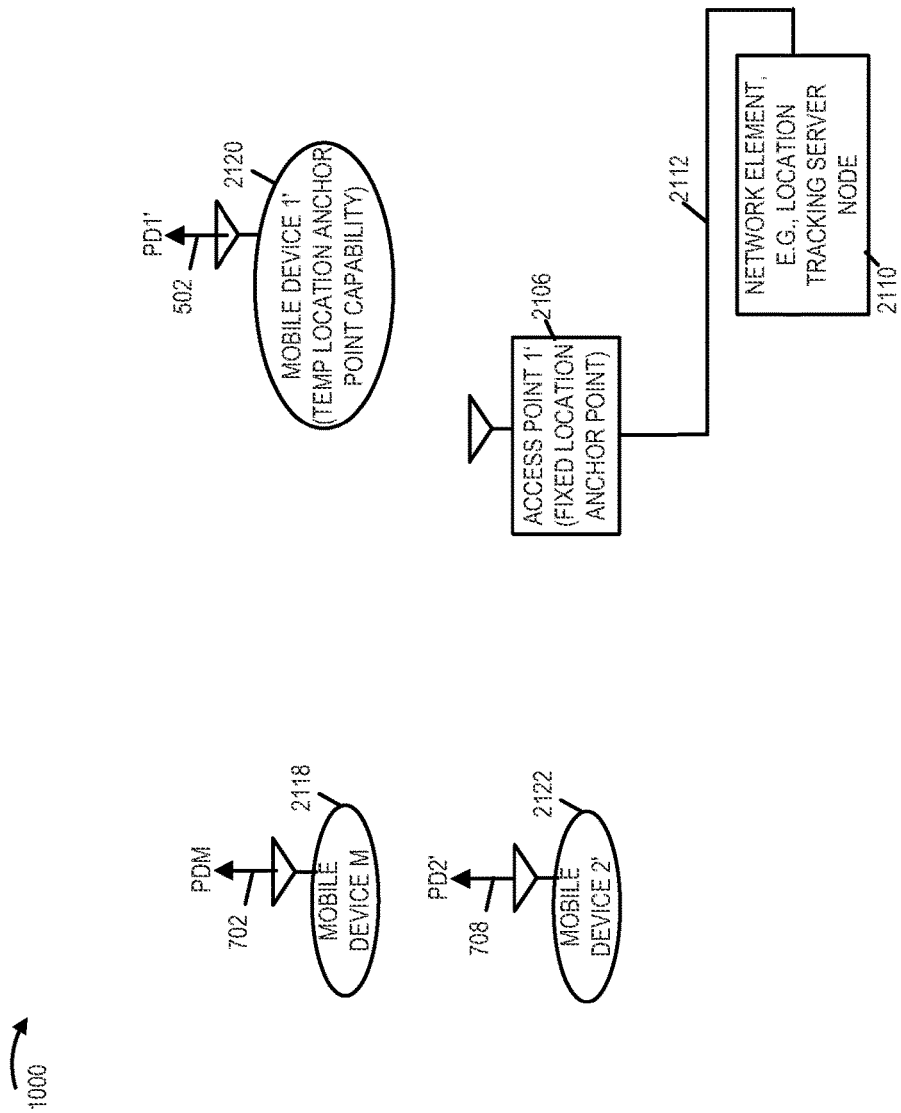
FIG. 10 is a drawing illustrating that a mobile device which has been operating as a location anchor stops operating as a location anchor point.
Figure 11:
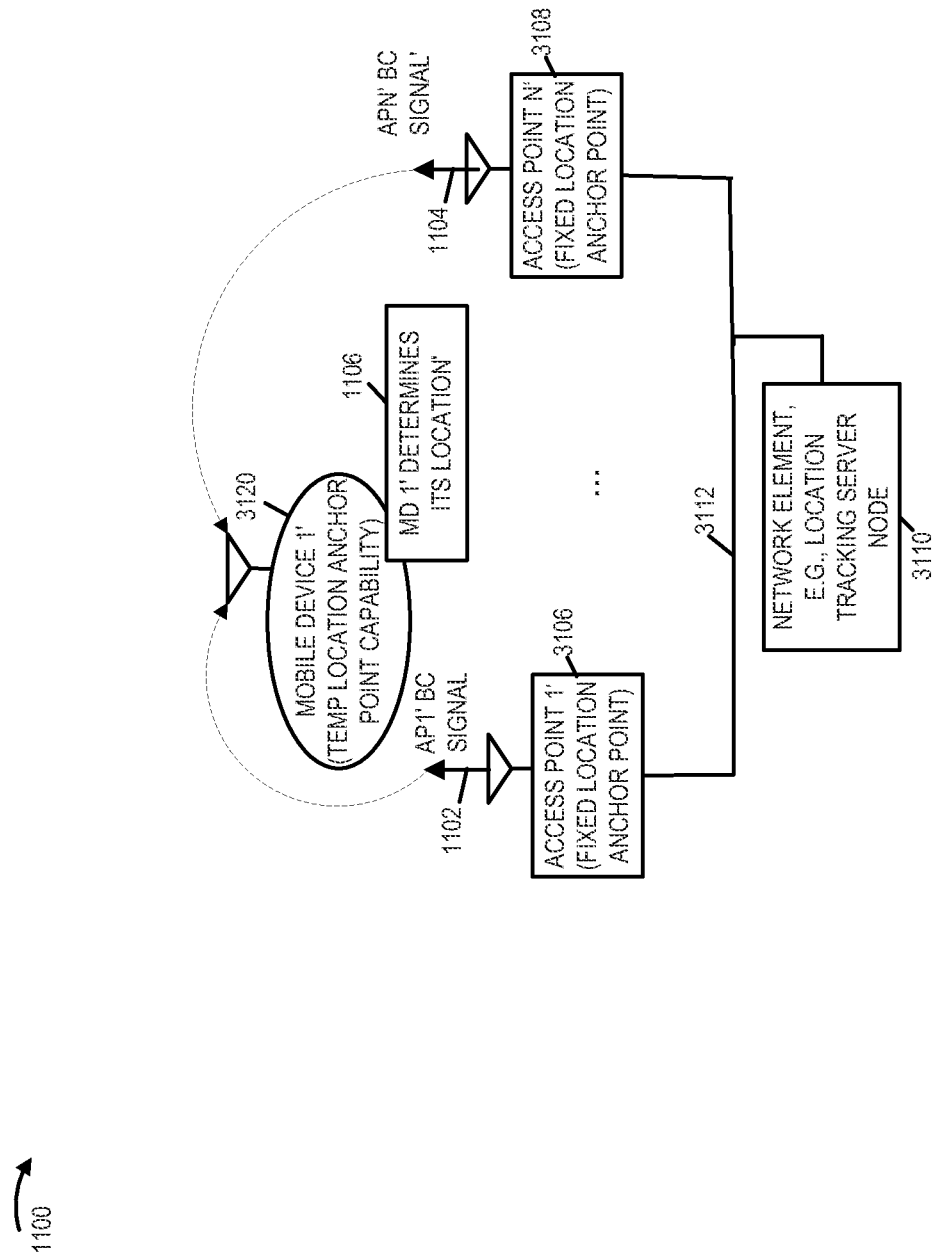
FIG. 11 is a drawing illustrating a mobile device's position being determined by the mobile device based on received broadcast signals from location anchor points.

In drawing 1000 of FIG. 10, mobile device 1' 2120 has determined, based on the time information 608 communicated in temporary location anchor point instruction command signal 610 of FIG. 6, that it is no longer to operate as a location anchor point. Mobile devices (device 1' 2120, device 2' 2122, device M 2118) transmit their peer discovery signals (PD1' 502, PD2' 708, PDM 702), respectively.

FIGS. 11-17 illustrate an example, in which a mobile device at a known location is commanded to and operates as a temporary location anchor point. Drawing 1100 of FIG. 11 includes access point 1' 3106, access point N' 3108, and network element 3110 coupled together via backhaul network 3112. Access point 1' 3106 and access point N' 3108 operate as fixed location anchor points. Network element 3110 is, e.g., a location tracking server node which tracks the location of mobile devices. Drawing 1100 also include mobile device 1' 3120 which includes the capability to operate as a temporary location anchor point. Mobile device 1' 3120 is, e.g., mobile device 1' 120 of system 100 of FIG. 1; access point 1' 3106 is, e.g., access point 1' 106 of system 100 of FIG. 1; access point N' 3108 is, e.g., access point N' 108 of system 100 of FIG. 1; network element 3110 is, e.g., network element 110 of system 100 of FIG. 1; and backhaul network 3112 is, e.g., backhaul network 112 of system 100 of FIG. 1.

Access point 1' 3106 transmits access point 1' broadcast signal 1102. Mobile device 1' 3120 receives signal 1102 and measures the received signal strength. Access point N' 3108 transmits access point N' broadcast signal 1104. Mobile device 1' 3120 receives signal 1102 and measures the received signal strength. Mobile device 3120 determines its location based on the received signals as indicated by box 1106.

Figure 12:
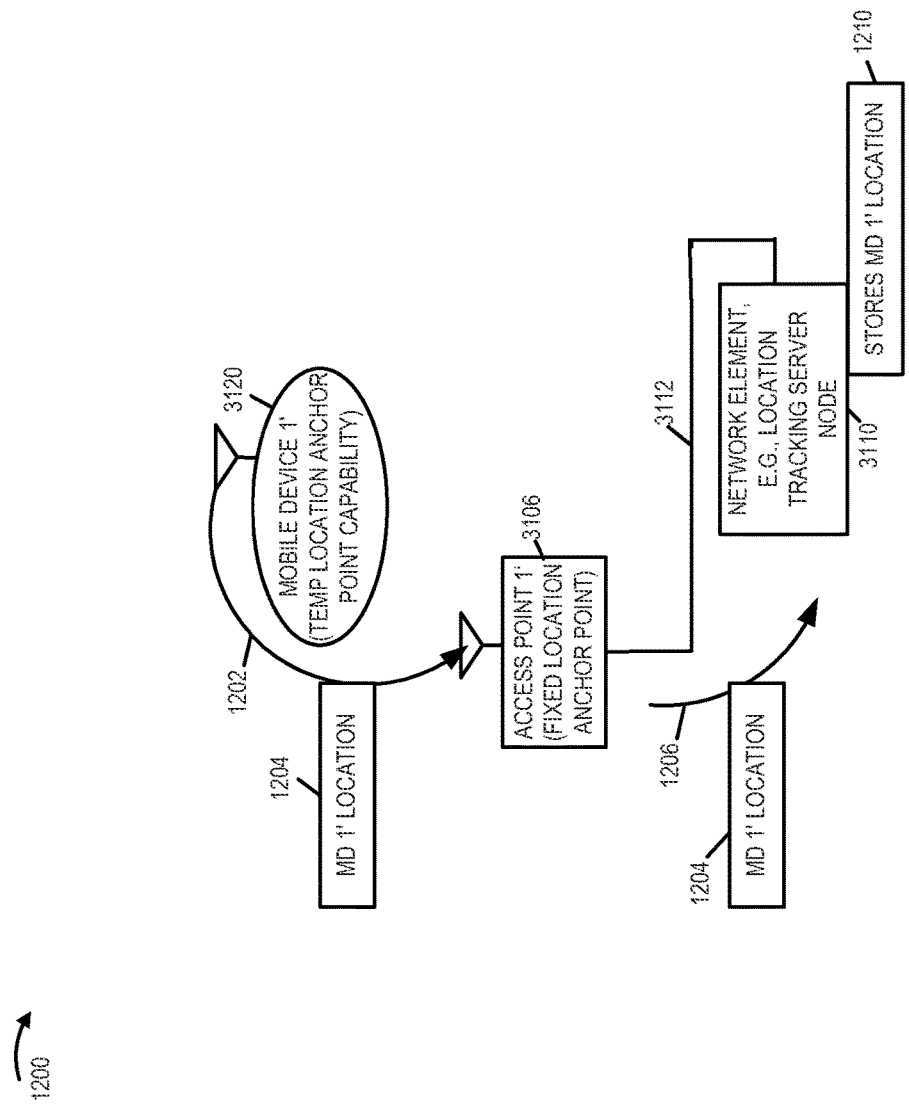
FIG. 12 illustrates a mobile device, which has determined its position, communicating the determined position to a network element, e.g., to a location tracking server node.

In drawing 1200 of FIG. 12 mobile device 1' 3120 generates and transmits over the air signal 1202 which communicates mobile device 1' location 1204 to access point 1' 3106. Access point 1' 3106 receives signal 1202 and generates signal 1206 which communicates mobile device 1' location 1204. Access point 1' 3106 transmits signal 1206 to network element 3110 via backhaul network 3112. Network element 3110 receives signal 1206 and stores mobile device 1' location information as indicated by block 1210.

Figure 13:
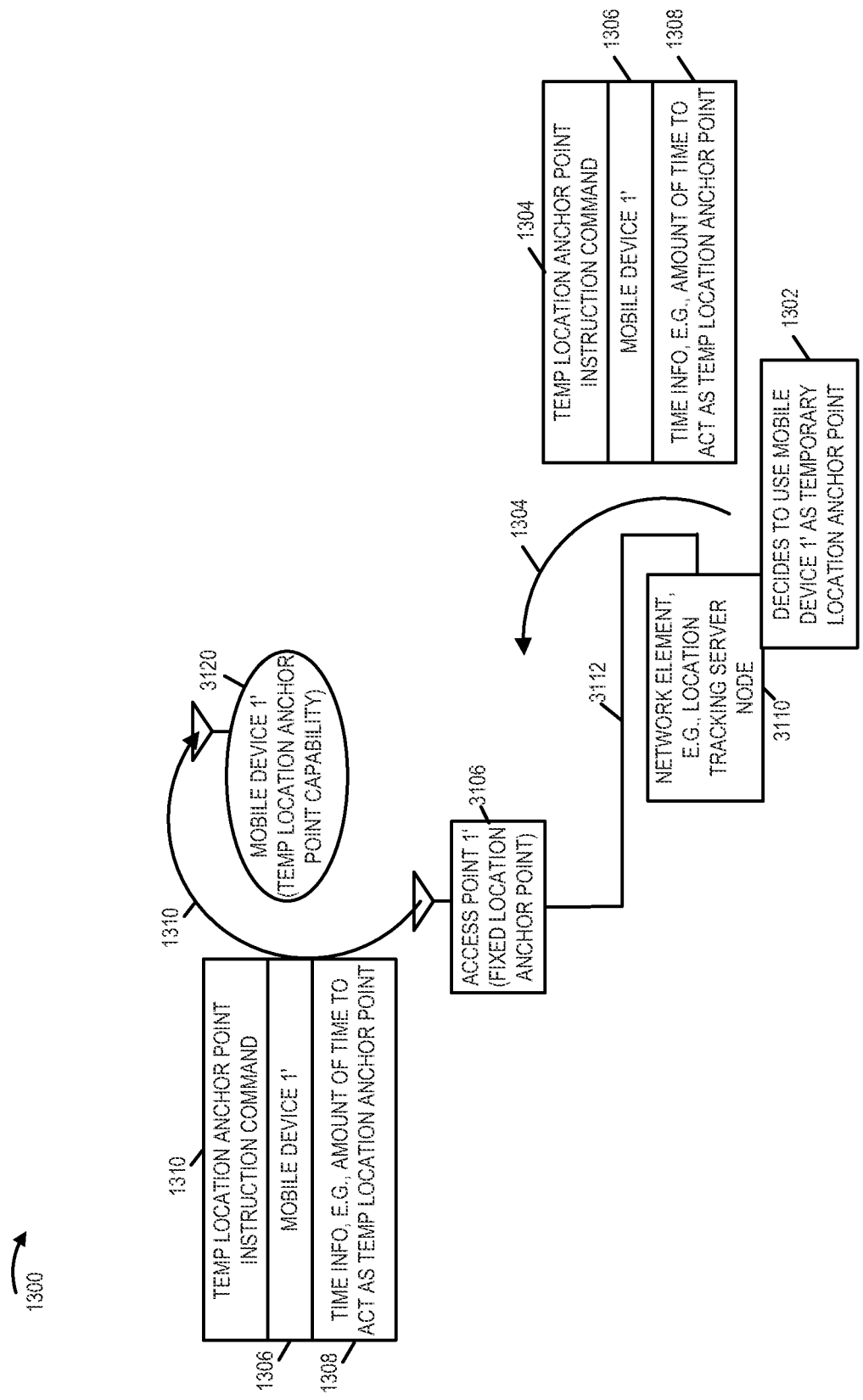
FIG. 13 is a drawing illustrating a mobile device being commanded to operate as a location anchor point.

In drawing 1300 of FIG. 13, network element 3110 decides to use mobile device 1' 3120 as a temporary location anchor point as indicated by block 1302. Network element 3110 generates temporary location anchor point instruction command signal 1304 and transmits signal 1304 over backhaul network 3112 to access point 1' 1306. Temporary location anchor point instruction command signal 1304 includes information 1306 which identifies mobile device 1' as the device which is being commanded to operate as a location anchor point and time information 1308, e.g., information indicating an amount of time mobile device 1' is to operate as a location anchor point. Signal 1304 is received by access point 1' 1306, which generates temporary location anchor point instruction command signal 1310. Temporary location anchor point instruction command signal 1310 includes information 1306 and 1308. Access point 1' 3106 transmits temporary location anchor point command signal 1310 over the air to mobile device 1' 3120. Mobile device 1' 3120 receives temporary location anchor point command signal 1310 and transitions to operate as a location anchor point.

Figure 14:
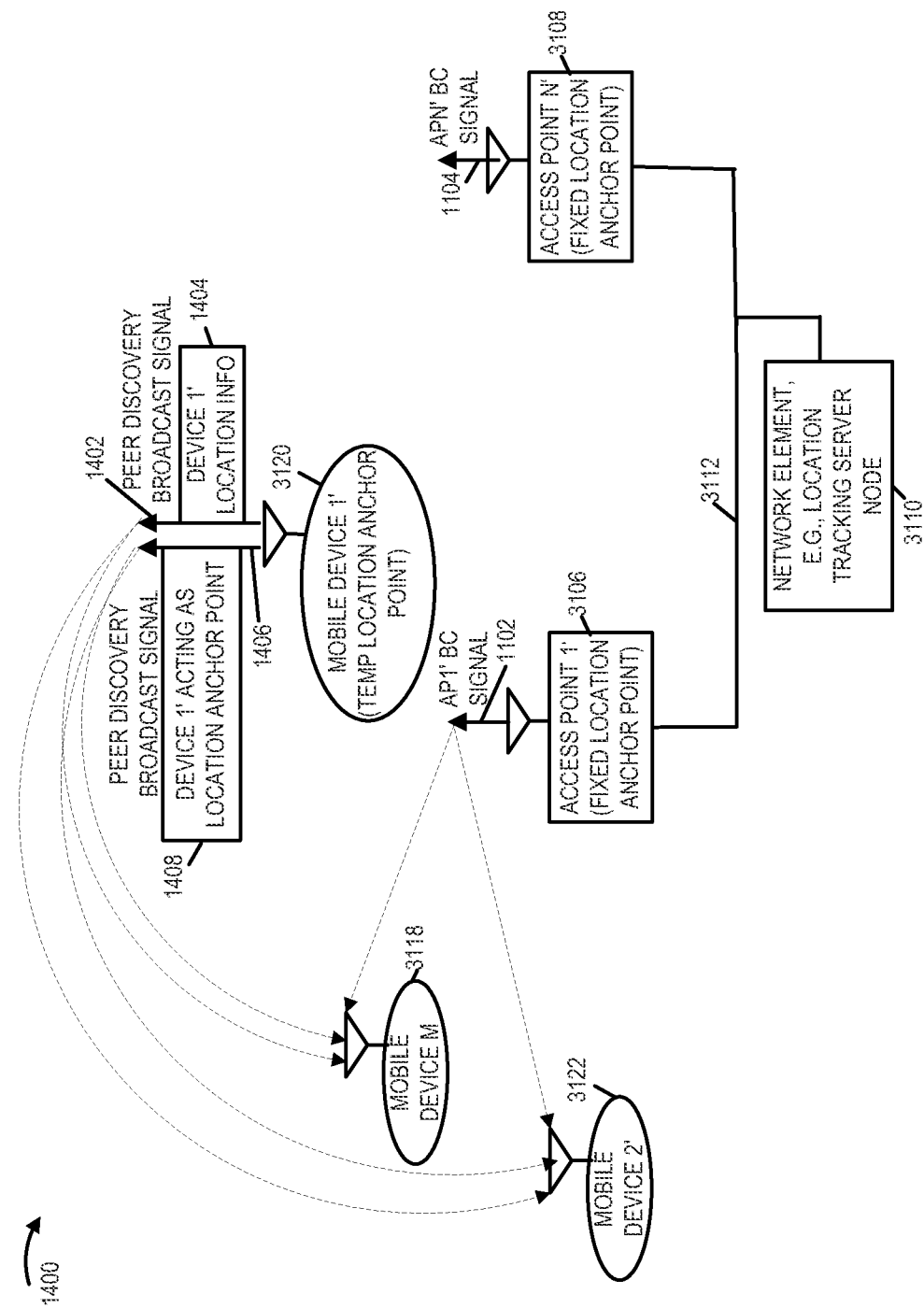
FIG. 14 is a drawing illustrating location anchor points broadcasting signals which are detected by mobile devices.

In drawing 1400 of FIG. 14, mobile device 1' 3120 is operating as a location anchor point in response to having received command 1310. Mobile device 1' 3120 broadcasts peer discovery broadcast signal 1402 including mobile device 1' location information 1404. Mobile device 1' 3120 also broadcasts peer discovery broadcast signal 1406 including information 1408 indicating that mobile device 1' is acting as a location anchor point. In some embodiments, information 1404 and information 1408 are included in the same broadcast signal. Access point 1' 3106 is transmitting access point 1' broadcast signal 1102. In various embodiments, AP1' broadcast signal 1102 does not include location information because access point 1' is a fixed location anchor point whose location is known to the mobile devices.

Mobile device M 3118 and mobile device 2' 3122 are in the local vicinity of mobile device 1' 3120 and access point 1' 3106. Mobile device M 3118 and mobile device 2' receive signals 1402 and 1406 and recognize that mobile device 1' is now operating as a location anchor point. Mobile device M 3118 and mobile device 2' 3122 also receive access point 1' broadcast signal 1102. Mobile device M 3118 measures the signal strengths of received signals (1402, 1406, 1102). Mobile device 2' 3122 measures the signal strengths of received signals (1402, 1406, 1102).

Figure 15:
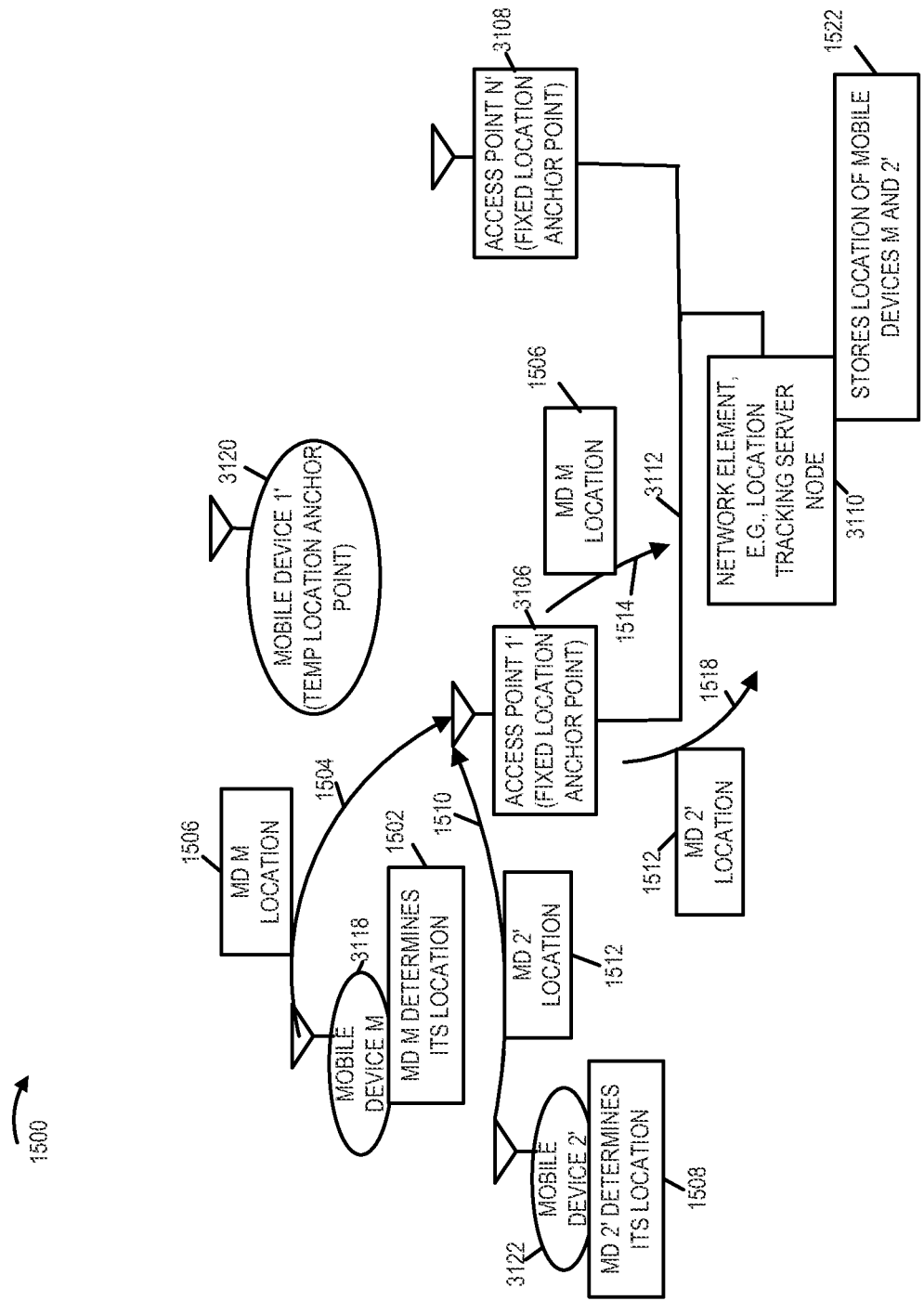
FIG. 15 illustrates mobile devices determining position based on received broadcast signals from location anchor points and the communication of determined mobile device location information to a network element, e.g., to a location tracking server node.

In drawing 1500 of FIG. 15, mobile device M 3118 determines its location based on the received signal strength measurements as indicated by block 1502. Mobile device M 3118 generates signal 1504 which includes mobile device M location information 1506. Mobile device M 3118 transmits signal 1504 over the air to access point 1' 3106. Access point 1' 3106 generates and transmits signal 1514 including mobile device M location information 1506 to network element 3110 over backhaul 3112.

Mobile device 2' 3122 determines its location based on the received signal strength measurements as indicated by block 1508. Mobile device 2' 3122 generates signal 1510 which includes mobile device 2' location information 1512. Mobile device 2' 3122 transmits signal 1510 over the air to access point 1' 3106. Access point 1' 3106 generates and transmits signal 1518 including mobile device 2' location information 1512 to network element 3110 over backhaul 3112. In some embodiments, access point 1' transmits mobile device M location information 1506 and mobile device 2' location information 1512 to network element 3110 in a common message. Network element receives signals 1514 and 1518 and stores the location of mobile devices 2' and M as indicated by block 1522.

Figure 16:
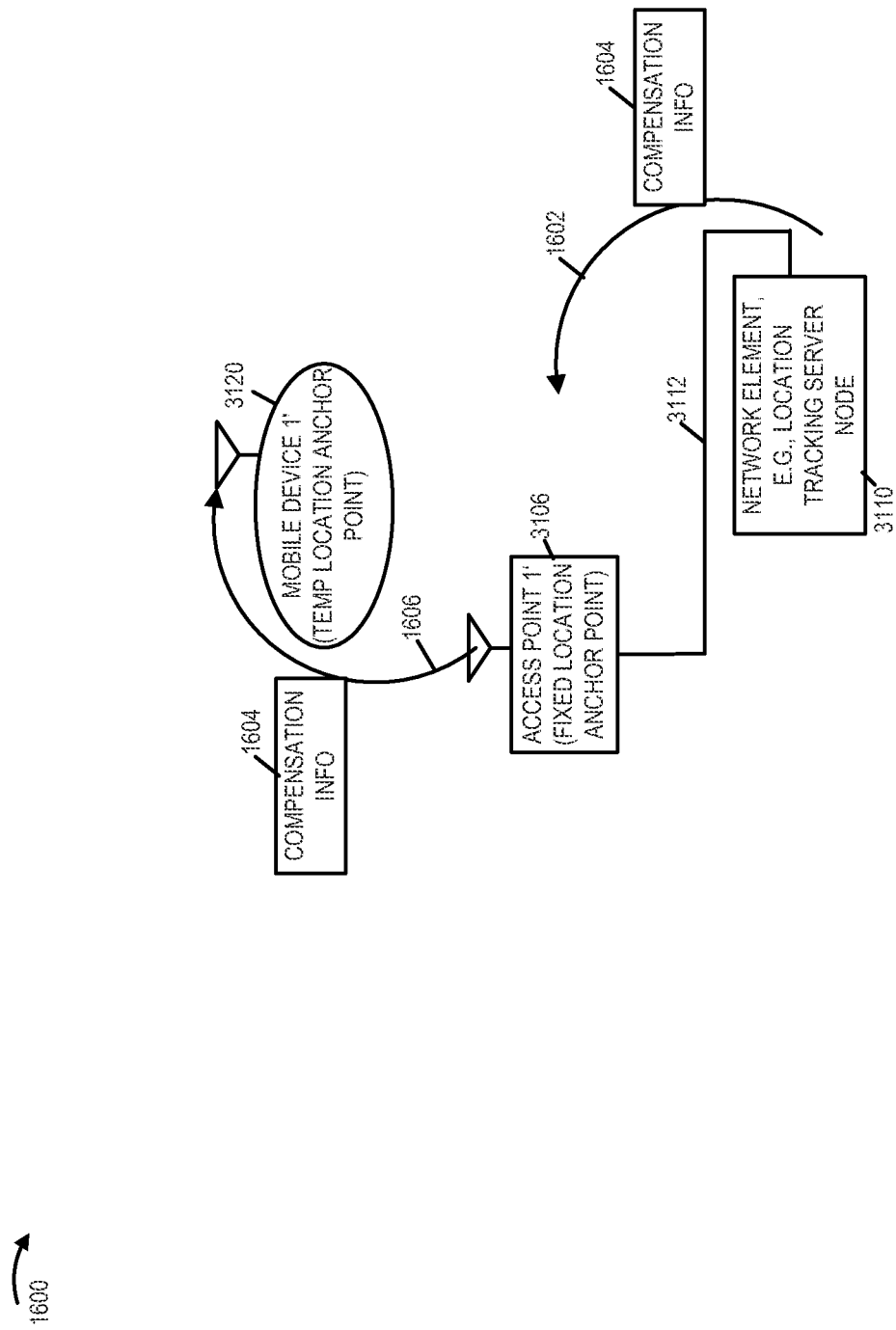
FIG. 16 is a drawing illustrating that a mobile device which has operated temporarily as a location anchor point receives compensation for operating as a location anchor point.

In drawing 1600 of FIG. 16, network element 3110 generates and transmits signal 1602 communicating compensation information 1604 identifying the compensation mobile device 1' 3120 is to receive for acting as a location anchor point. Signal 1602 is communicated via backhaul network 3112 from network element 3110 to access point 1' 3106. Access point 1' 3106 generates signal 1606, which it transmits over the air to mobile device 1' 3120 communicating compensation information 1604. Mobile device 1' 3120 receives signal 1606 and receives the compensation for acting as a location anchor point. In some embodiments, mobile device 1' 3120 receives information indicating a grant of an increase in a QoS level being provided to mobile device 1' 3120 as compensation for acting as a location anchor point. In some embodiments, mobile device 1' 3120 receives a service to which mobile device 1' 3120 was not previously entitled to receive as compensation for acting as a location anchor point. In some embodiments, mobile device 1' 3120 receives an accounting credit providing mobile device 1' 3120 a credit against charges for services used by mobile device 1' 3120.

Figure 17:
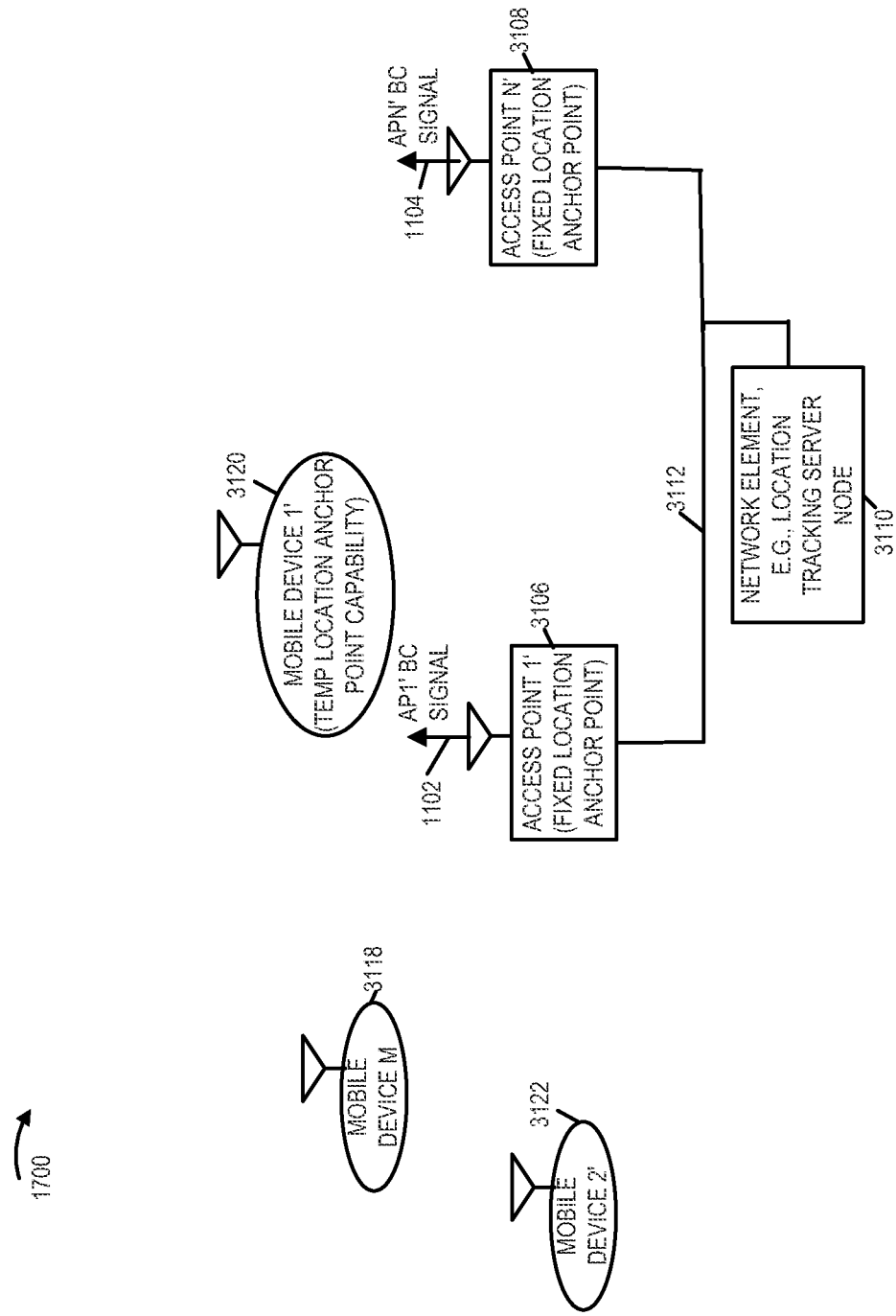
FIG. 17 is a drawing illustrating that a mobile device which has been operating as a location anchor stops operating as a location anchor point.

In drawing 1700 of FIG. 17, mobile device 1' 3120 has determined, based on the time information 1308 communicated in temporary location anchor point instruction command signal 1310 of FIG. 13, that it is no longer to operate as a location anchor point. Mobile device 1' 3120 ceases transmitting broadcast signals 1402, 1406. Access point 1' 3106 and access point N' 3108 which are fixed location anchor points continue broadcasting their broadcast signals (1102, 1104), respectively.

In the example, of FIGS. 11-17, a mobile device determines its location based on received broadcast signals from location anchor points which may include fixed location anchor points and temporary location anchor points. In some embodiments, a mobile device performs signal measurements of received broadcast signals from fixed location anchor points and/or temporary location anchor points and communicates the measurement information to another node which determines the mobile device position. For example, measurement information, in some embodiments, is forwarded to a network element, e.g., a location tracking server node, which determines mobile node device positions.

Figure 18:
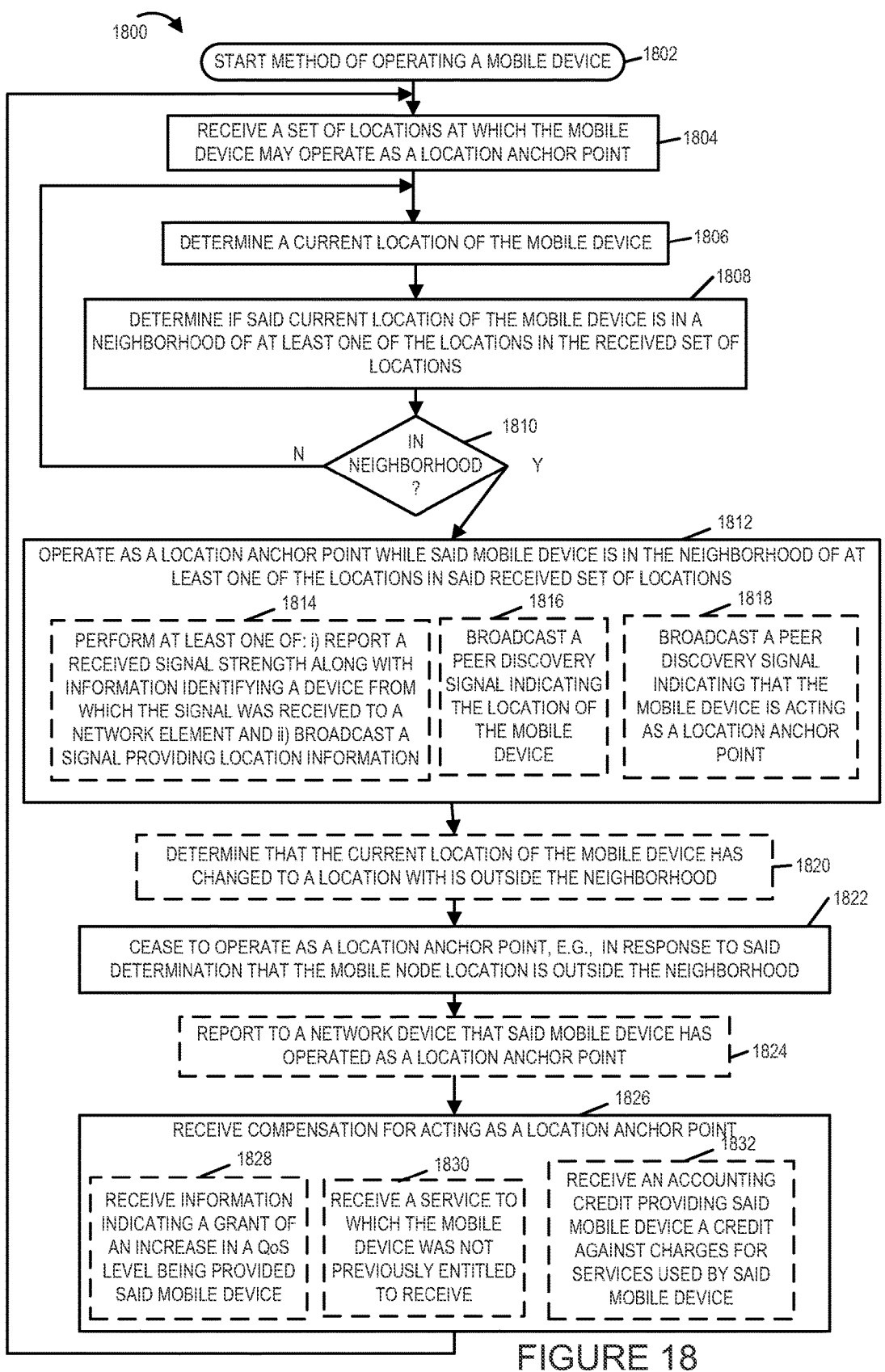
FIG. 18 is a flowchart illustrating exemplary methods of operating a mobile device, e.g., a mobile wireless terminal including the capability to act as a temporary location anchor point, in accordance with various exemplary embodiments.

FIG. 18 is a flowchart 1800 of an exemplary method of operating a mobile device, e.g., a mobile wireless terminal, in accordance with an exemplary embodiment. The mobile device is, e.g., one of the mobile devices (mobile device 1' 120, mobile device 2' 122, . . . , mobile device M' 124) of communications system 100 of FIG. 1 which includes the capability to serve as a temporary location anchor point.

Operation of the exemplary method starts in step 1802, where the mobile device is powered on and initialized and proceeds to step 1804. In step 1804 the mobile device receives a set of locations at which the mobile device may operate as a location anchor point. In some embodiments, said received set of locations at which the mobile may operate as an anchor point is received in a request. In some embodiments, the request is from a location determination server. In some such embodiments, the request is communicated from the location determination server to the mobile node via an access point.

In some embodiments, the request is communicated in a broadcast signal. In some other embodiments, the request is communicated in a signal directed specifically to the mobile device, e.g., in a signal including an identifier associated with the mobile device. In some embodiments, the received request includes time information indicating an amount of time the mobile device is being requested to operate as a location anchor point. In some embodiments, the request includes information indicating a time range or time window in which the mobile device is being requested to operate as a location anchor point. In various embodiments, the received set of locations at which the mobile device may operate as a location anchor point is received in a command. Operation proceeds from step 1804 to step 1806.

In step 1806 the mobile device determines a current location of the mobile device. Operation proceeds from step 1806 to step 1808. In step 1808 the mobile device determines if the current location of the mobile device is in a neighborhood of at least one of the locations in the received set of locationS. In some embodiments, said neighborhood is a geographic area including said at least one of the locations. In various embodiments, the neighborhood is an extending area having a predetermined distance around said at least one location. Operation proceeds from step 1808 to step 1810.

In step 1810, if the determination of step 1808 is that the current location of the mobile device is not in a neighborhood of at least one of the locations in the received set of location then operation proceeds from step 1810 to step 1806, where the mobile device determines the current location. However, in step 1810, if the determination of step 1808 is that the current location of the mobile device is in a neighborhood of at least one of the locations in the set of received locations, then operation proceeds from step 1810 to step 1812.

In step 1812 the mobile device operates as a location anchor point while said mobile device is in the neighborhood of at least one of the locations in said received set of locations. In some embodiments, the mobile device performs one or more or all of: steps 1814, 1816 and 1818 as part of operating as a location anchor point. In step 1814 the mobile device performs at least one of: i) reporting a received signal strength along with information identifying a device from which the signal was received to a network element and ii) broadcasting a signal providing location information. In step 1816 the mobile device broadcasts a peer discovery signal indicating the location of the mobile device. In step 1818 the mobile device broadcasts a peer discovery signal indicating the mobile device is acting as a location anchor point.

Operation proceeds from step 1812 to step 1820. In step 1820 the mobile device determines that the current location of the mobile device has changed to a location which is outside the neighborhood. Operation proceeds from step 1820 to step 1822. In step 1822 the mobile device ceases to operate as a location anchor point, e.g., in response to determining that the mobile device has changed its current location to a location which is outside the neighborhood. In some embodiments, the mobile device ceases operating as a location anchor point when the mobile device determines that it has operated as a location anchor point for the length of time indicated in the received request to operate as a location anchor point. In some embodiments, the mobile device ceases to operate as a location anchor point when the time endpoint for operating as a location anchor point, which was communicated in the request, has been reached. Operation proceeds from step 1822 to step 1824.

In step 1824 the mobile device reports to a network device that said mobile device has operated as a location anchor point. In some such embodiments, the mobile device also reports the length of time the mobile device has operated as a location anchor point. Operation proceeds from step 1824 to step 1826.

In step 1826 the mobile device receives compensation for acting as a location anchor point. In various embodiments, step 1826 includes one or more or all of: steps 1828, 1830 and 1832. In step 1828 the mobile device receives information indicating a grant of an increase in a QoS level being provided said mobile device. In step 1830 the mobile device receives a service to which the mobile device was not previously entitled to receive. In step 1832 the mobile device receives an accounting credit providing said mobile device a credit against charges for service used by said mobile device.

Operation proceeds from step 1826 to step 1804, where the mobile device may again receive a set of locations at which the mobile device may operate as a location anchor point.

Steps 1820 and 1824 are optional steps. One or more of optional steps 1820 and 1824 are included in some embodiments. The flowchart of FIG. 18 has been described where optional steps 1820 and 1824 are performed. If an optional step is omitted, the omitted step is bypassed in the operational flow.

In some embodiments, in place of step 1820 the mobile device determines that the mobile device has operated for the length of time that it was requested to operate as a location anchor point. In some such embodiments, in step 1822 the mobile device ceases to operate as a location anchor point in response to determining that the mobile device has operated for the length of time that it was requested to operate as a location anchor point.

In some embodiments, in place of step 1820 the mobile device determines that the current time has reached an end time point, e.g., an end time point communicated in the request, at which the mobile device is to cease operating as a location anchor point. In some such embodiments, in step 1822 the mobile device ceases to operate as a location anchor point in response to determining that the current time has reached the end point in time for which the mobile device was requested to operate as a location anchor point.

In some embodiments, the mobile device monitors remaining battery power. In some such embodiments, the mobile device ceases operating as a location anchor point when remaining battery power is below a predetermined level.

In various embodiments, during different iterations of the flowchart, a different reason may be used to cease operation as a location anchor point, e.g., one time may be due to the mobile device moving outside the neighborhood of a received location for which the mobile device was requested to operate as a location anchor point; another time may be due to a requested location anchor point operation time length being satisfied; another time may be due to a specified location anchor point end time being reached; another time may be due to a monitored battery power level going below a predetermined limit; and still another time may be due to a mobile device desire to participate in more communications with other devices, e.g., the mobile device would like to devote more time and/or resources to peer to peer communications, e.g., in response to a trigger event such as the detection of peer device of interest which has moved into its vicinity.

In some embodiments, the mobile node reports, e.g., to a location determination server, when it starts and when it ceases operating as a location anchor point. In some embodiments, a network node, e.g., a location determination server, tracks the time the mobile node is operating as a location anchor point without the mobile node reporting directly to the network node. For example, other devices may sense that the mobile node is acting as a temporary location anchor point and report that information to the network node, e.g., to the location determination server.

Figure 19:
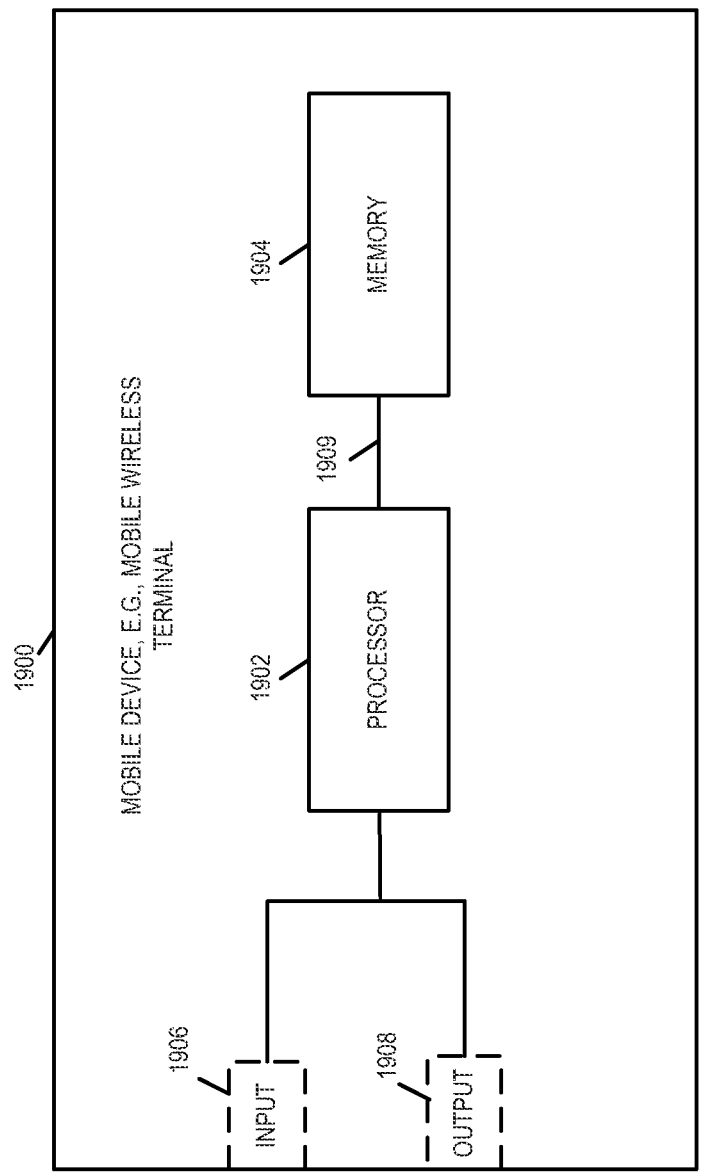
FIG. 19 is a drawing of an exemplary mobile device in accordance with an exemplary embodiment.

FIG. 19 is a drawing of an exemplary mobile device, e.g., a mobile wireless terminal, in accordance with an exemplary embodiment. Exemplary mobile device 1900 is, e.g., one of the mobile devices including the capability to serve as a temporary location anchor point (120, 122, . . . 124') of system 100 of FIG. 1. Exemplary mobile device 1900 may, and sometimes does, implement a method in accordance with flowchart 1800 of FIG. 18.

Mobile device 1900 includes a processor 1902 and memory 1904 coupled together via a bus 1909 over which the various elements (1902, 1904) may interchange data and information. Mobile device 1900 further includes an input module 1906 and an output module 1908 which may be coupled to processor 1902 as shown. However, in some embodiments, the input module 1906 and output module 1908 are located internal to the processor 1902. Input module 1906 can receive input signals. Input module 1906 can, and in some embodiments does, include a wireless receiver and/or a wired or optical input interface for receiving input. Output module 1908 may include, and in some embodiments does include, a wireless transmitter and/or a wired or optical output interface for transmitting output.

Processor 1902 is configured to: receive a set of locations at which the mobile device may operate as a location anchor point, determine a current location, and determine if said current location of the mobile device is in a neighborhood of at least one of the locations in the received set of locations. In some embodiments, the received set of locations at which the mobile device may operate as a location anchor point is received in a request. In some such embodiments, the request is from a location determination server. In some embodiments, the request is communicated in a broadcast signal. In some embodiments, the request is communicated in a signal directed specifically to the mobile device which is identified by an identifier associated with the mobile device. In various embodiments, the request includes time information indicating an amount of time the mobile device is requested to operate as a location anchor point. In some embodiments, the request includes information identifying a period of time or time range during which the mobile device is requested to operate as a location anchor point, e.g., a start time point and an end time point.

In some embodiments, the neighborhood is a geographic area including said at least one of the locations. In some embodiments, the neighborhood is an extending area having a predetermined distance around said at least one location.

Processor 1902 is further configured to control mobile device operation as a function of the determination if said current location of the mobile device is in a neighborhood of at least one of the locations in the received set of locations. Processor 1902 is further configured to operate as a location anchor point while said mobile device is in the neighborhood of at least one of the locations in the received set of locations.

In some embodiments, processor 1902 is configured to determine when the current location of the mobile device has changed to a location which is outside the neighborhood. In various embodiments, processor 1902 is configured to control said mobile device to cease operating as a location anchor point in response to a determined change in location to a location which is outside the neighborhood.

In some embodiments, processor 1902 is configured to determine when the mobile device has operated as a location anchor point for the length of time that the mobile device was requested to operate as a location anchor point. In various embodiments, processor 1902 is configured to control said mobile device to cease operating as a location anchor point in response to a determination that the mobile device has operated as a location anchor point for the length of time that the mobile device was requested to operate as a location anchor point.

In some embodiments, processor 1902 is configured to determine when the current time has reached the end point in time for which the mobile device was requested to operate as a location anchor point. In various embodiments, processor 1902 is configured to control said mobile device to cease operating as a location anchor point in response to a determination that the current time has reached the end point in time for which the mobile device was requested to operate as a location anchor point.

In some embodiments, processor 1902 is configured to monitor remaining battery power and to control the mobile device to cease operating as a location anchor point in response to a determination that the remaining battery power is below a predetermined level.

In various embodiments, processor 1902 is configured to report to a network device that said mobile device has operated as a location anchor point. In some such embodiments, processor 1902 is further configured to report the length of time that the mobile device has operated as a location anchor point.

In some embodiments, processor 1902 is configured to report when the mobile device starts operating as a location anchor point, e.g., sending a temporary location anchor point activation notification message to the device which request the mobile device to operate as an anchor point. In some such embodiments, the temporary location anchor point activation notification message includes an identifier associated with the mobile device, the current location of the mobile device, and start time for operating as a location anchor point. In some such embodiments, the temporary location anchor point activation notification message further includes information identifying a power level associated with the mobile device, e.g., a power level to be used by the mobile device for broadcasting at least some types of signals while serving as a location anchor point. In some embodiments, processor 1902 is configured to report when the mobile device ceases operating as a location anchor point, e.g., sending a temporary location anchor point termination notification message to the device which requested the mobile device to operate as a location anchor point.

In some embodiments, processor 1902 is configured to perform at least one of: i) reporting a received signal strength along with information identifying a device from which the signal was received to a network element; and ii) broadcasting a signal providing location information, as part of being configured to control said mobile device to operate as a location anchor point. In some embodiments, processor 1902 is configured to broadcast a peer discovery signal indicating the location of the mobile device, as part of being configured to control said mobile device to operate as a location anchor point. In various embodiments, processor 1902 is configured to broadcast a peer discovery signal indicating that the mobile device is acting as a location anchor point, as part of being configured to control said mobile device to operate as a location anchor point.

In some embodiments processor 1902 is further configured to: receive compensation for acting as a location anchor point. In some such embodiments, processor 1902 is configured to: receive information indicating a grant of an increase in a QoS level being provided said mobile device, as part of being configured to receive compensation for acting as a location anchor point include. In some embodiments, processor 1902 is configured to receive a service to which the mobile device was not previously entitled to receive, as part of being configured to receive compensation for acting as a location anchor point. In various embodiments, processor 1902 is configured to receive an accounting credit providing said mobile device a credit against charges for services used by said mobile device, as part of being configured to receive compensation for acting as a location anchor point.

Figure 20:
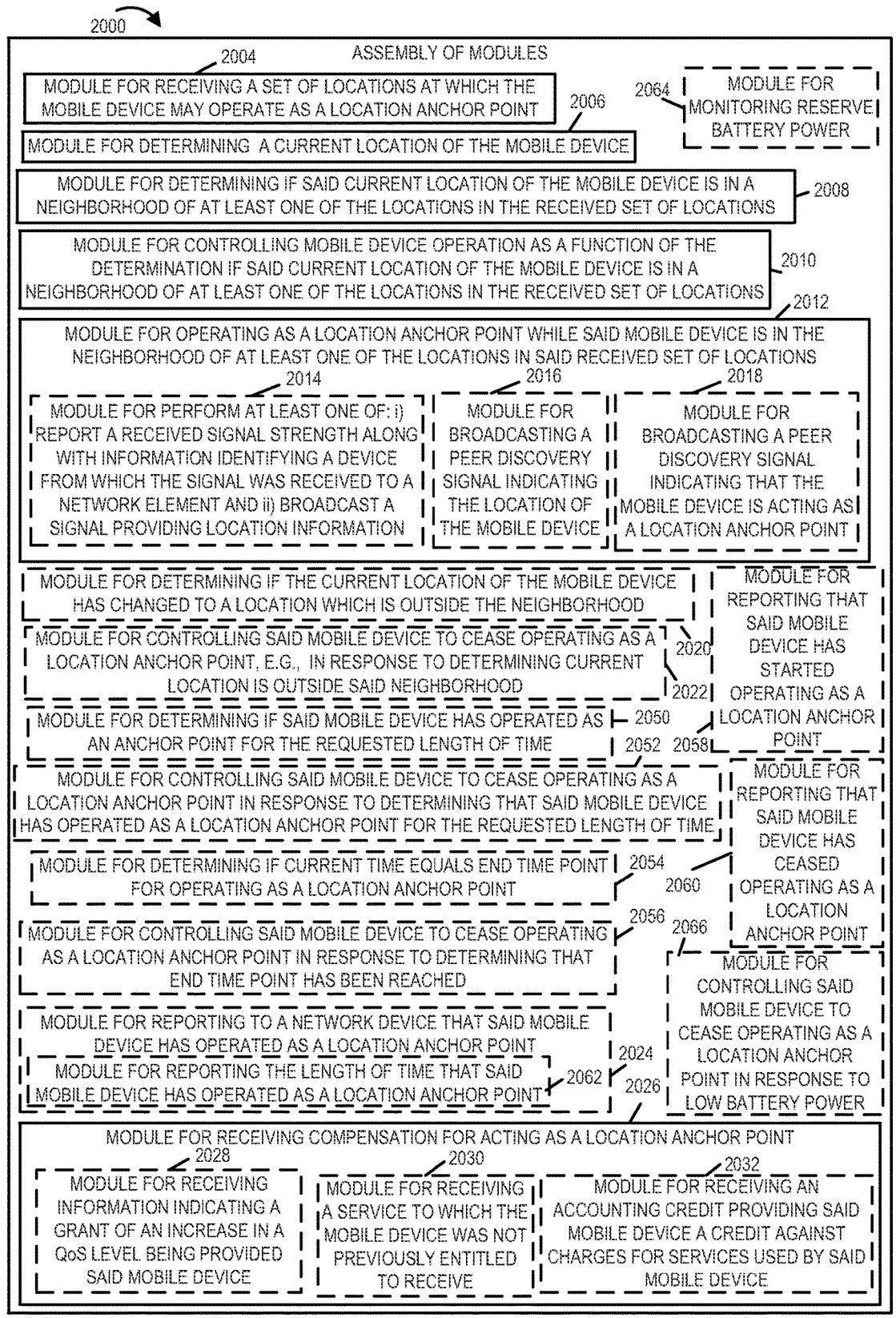
FIG. 20 is an assembly of modules which may be used in the exemplary mobile device of FIG. 19.

FIG. 20 is an assembly of modules 2000 which can, and in some embodiments is, used in the mobile device 1900 illustrated in FIG. 19. The modules in the assembly 2000 can be implemented in hardware within the processor 1902 of FIG. 19, e.g., as individual circuits. Alternatively, the modules may be implemented in software and stored in the memory 1904 of the mobile device 1900 shown in FIG. 19. While shown in the FIG. 19 embodiment as a single processor, e.g., computer, it should be appreciated that the processor 1902 may be implemented as one or more processors, e.g., computers. When implemented in software the modules include code, which when executed by the processor, configure the processor, e.g., computer, 1902 to implement the function corresponding to the module. In some embodiments, processor 1902 is configured to implement each of the modules of the assembly of modules 2000. In embodiments where the assembly of modules 2000 is stored in the memory 1904, the memory 1904 is a computer program product comprising a computer readable medium, e.g., a non-transitory computer readable medium, comprising code, e.g., individual code for each module, for causing at least one computer, e.g., processor 1902, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 20 control and/or configure the mobile device 1900 or elements therein such as the processor 1902, to perform the functions of the corresponding steps illustrated and/or described in the method of flowchart 1800 of FIG. 18.

Assembly of modules 2000 includes a module 2004 for receiving a set of locations at which the mobile device may operate as a location anchor point, a module 2006 for determining a current location of the mobile device, a module 2008 for determining if said current location of the mobile device is in a neighborhood of at least one of the locations in the received set of locations, a module 2010 for controlling the mobile device operation as a function of the determination if said current location of the mobile device is in a neighborhood of at least one of the locations in the received set of locations, a module 2012 for operating as a location anchor point while said mobile device is in the neighborhood of at least one of the location in said received set of locations, and a module 2026 for receiving compensation for acting as a location anchor point.

In various embodiment, said neighborhood is a geographic area including said at least one of the locations. In some embodiments, the neighborhood is an area extending a predetermined distance around said at least one location.

In some embodiments, the received set of locations at which the mobile may operate as a location anchor point is received in a request. In some such embodiments, the request is from a location determination server, e.g., via an access point. In some embodiments, the request is communicated in a broadcast signal. In some embodiments the request is included in a signal directed specifically for the mobile device, e.g., an identifier associated with the mobile device is included in the request. In various embodiments, the identifier is one of: an individual device identifier, an individual user identifier, a device group identifier and a user group identifier. In some embodiments, the request includes time information indicating an amount of time the mobile device is to operate as a location anchor point. In some embodiments, the request includes time information indicating a range of time for which the mobile device is being requested to operate as a location anchor point.

In some embodiments, module 2012 includes one or more or all of: a module 2014 for performing at least one of: i) reporting a received signal strength along with information identifying a device from which the signal was received to a network element and ii) broadcasting a signal providing location information, a module 2016 for broadcasting a peer discovery signal indicating the location of the mobile device, and a module 2018 for broadcasting a peer discovery signal indicating that the mobile device is acting as a location anchor point. In various embodiments, module 2026 includes one or more or all of: a module 2028 for receiving information indicating a grant of an increase in a QoS level being provided said mobile device, a module 2030 for receiving a service to which the mobile device was not previously entitled to receive, and a module 2032 for receiving an accounting credit providing said mobile device a credit for services used by said mobile device.

In some embodiments, assembly of modules 2000 includes one or more or all of: a module 2020 for determining if the current location of the mobile device has changed to a location which is outside the neighborhood, a module 2022 for controlling said mobile device to cease operating as a location anchor point, e.g., in response to said determining that the mobile has changed its location to a location that is outside the neighborhood, a module 2050 for determining if the mobile device has operated for the length of time as a location anchor point for which it was requested to operate as a location anchor point, a module 2052 for controlling said mobile device to cease operating as a location anchor point in response to said determination that said mobile device has operated as a location anchor point for the length of time that it was requested to operate as a location anchor point, a module 2054 for determining if the current time is the end point time for the which the mobile device was requested to operate as a location anchor point, and a module 2056 for controlling said mobile device to cease operating as an anchor point in response to said determination that the end point time for the which the mobile device was requested to operate as a location anchor point has been reached.

In various embodiments, assembly of modules 2000 includes one or more or all of: a module 2058 for reporting to a network device, e.g., to a location determination server, that said mobile has started operating as a location anchor point, a module 2060 for reporting to a network device, e.g., to a location determination server, that said mobile device has ceased operating as a location anchor point, and a module 2024 for reporting to a network device, e.g., to a location determination server, that said mobile device has operated as a location anchor point. In some embodiments, module 2024 includes a module for 2062 for reporting the length of time that the mobile device has operated as a location anchor point.

In some embodiments, assembly of modules 2000 includes a mobile 2064 for monitoring remaining battery power and a module 2066 for controlling said mobile device to cease operating as a location anchor point in response to a determination that remaining battery power is below a predetermined level.

In various embodiments a mobile device, e.g., mobile device 300 of FIG. 3 or mobile device 1900 of FIG. 19, includes a module corresponding to each of the individual steps and/or operations described with regard to any of the Figures in the present application and/or described in the detailed description of the present applications. The modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a mobile device at a known location, the method comprising:
   determining, by the mobile device, a location of the mobile device;
   processing, by the mobile device, one or more wireless signals received by the mobile device from a network element, said one or more wireless signals comprising a command instructing the mobile device to operate as a location anchor point for the location; and
   in response to receiving said command, operating the mobile device as a location anchor point for the location, wherein operating as a location anchor point comprises:
      reporting one or more measurements of one or more signals received from one or more other mobile devices; and
      broadcasting a signal providing location information.

2. The method of claim 1, wherein said one or more measurements of said one or more signals received from said one or more other mobile devices comprise a measurement of a received signal strength, and further wherein operating as a location anchor point comprises transmitting information identifying a device from which at least one of the one or more signals was received to a network element.

3. The method of claim 2, wherein operating the mobile device as a location anchor point further comprises transmitting, by the mobile device, a signal identifying said mobile device operating as a location anchor point.

4. The method of claim 1, wherein said command includes time information indicating an amount of time the mobile device is to operate as a location anchor point.

5. The method of claim 1, further comprising:
   receiving, by the mobile device and responsive to said transmission, a signal indicating compensation for transmission of said one or more measurements.

6. The method of claim 5 further comprising determining, by the mobile device, whether the mobile device is in the neighborhood of at least one location of a received set of locations; and determining whether the mobile device is to discontinue operating as a location anchor point based, at least in part, on an indication of an amount of time that the mobile device is to operate as a location anchor point.

7. The method of claim 1, wherein receiving said signal indicating compensation for transmission of said one or more measurements includes receiving information indicating a grant of an increase in a QoS level being provided to said mobile device.

8. The method of claim 1, wherein operating the mobile device as a location anchor point further comprises broadcasting a signal providing location information indicative of the location of the mobile device.

9. A mobile device comprising:
   means for determining a location of the mobile device;
   means for processing one or more wireless signals received by the mobile device from a network element, said one or more wireless signals comprising a command instructing the mobile device to operate as a location anchor point for the location; and
   means for operating as a location anchor point for the location, in response to receiving said command, said means for operating as a location anchor point further comprising:
   means for transmitting one or more measurements of one or more signals received from one or more other mobile devices, and means for broadcasting a signal providing location information.

10. The mobile device of claim 9, wherein said one or more measurements of said one or more signals received from said one or more other mobile devices comprise a measurement of a received signal strength, and further wherein said means for operating as a location anchor point further includes means for transmitting information identifying a device from which at least one of the one or more signals was received to a network element.

11. The mobile device of claim 10, wherein said means for operating as a location anchor point further comprises means for transmitting a signal identifying said mobile device operating as a location anchor point.

12. The mobile device of claim 9, wherein said command includes time information indicating an amount of time the mobile device is to operate as a location anchor point.

13. The mobile device of claim 9, further comprising:
means for receiving a signal indicating compensation responsive to said transmission of said one or more measurements.

14. The mobile device of claim 9, wherein said means for receiving said signal indicating compensation for transmission of said one or more measurements includes means for receiving information indicating a grant of an increase in a QoS level being provided to said mobile device.

15. A non-transitory computer-readable medium comprising machine-readable instructions stored thereon which are executable by a processor to:
determine, by a mobile device, a known location of the mobile device; and
operate the mobile device as a location anchor point for the known location responsive to reception of a command from one or more wireless signals received from a network element to operate as said location anchor point for the known location, wherein said code for causing the mobile device to operate as a location anchor point further comprises code for enabling:
transmit, by the mobile device, one or more measurements of one or more signals received from one or more other devices, and
broadcast a signal providing location information.

16. A mobile device comprising:
a transmitter and a receiver; and
at least one processor configured to:
determine a known location of the mobile device;
instruct the mobile device to operate as a location anchor point for the known location responsive to a command received via said receiver from one or more wireless signals received from a wireless device, wherein to instruct said mobile device to operate as a location anchor point for the known location further comprises to:
initiate transmission, via said transmitter, of one or more measurements of one or more signals received from one or more other devices, and
broadcast a signal providing location information; and
memory coupled to said at least one processor.

17. The mobile device of claim 16, wherein said one or more measurements of said one or more signals received from said one or more other mobile devices comprises a measurement of a received signal strength, and further wherein to operate as a location anchor point further comprises to transmit, via said transmitter, information identifying a device from which at least one of the one or more signals was received to a network element.

18. The mobile device of claim 16, wherein said command includes time information indicating an amount of time the mobile device is to operate as a location anchor point.

19. The mobile device of claim 16, wherein said at least one processor is further configured to:
receive, via said receiver and responsive to said transmission, a signal indicative of compensation for transmission of said one or more measurements.

20. The mobile device of claim 19, wherein to instruct said mobile device to operate as a location anchor point further comprises to: determine whether said mobile device is in the neighborhood of at least one location of a received set of locations; and determine whether said mobile device is to discontinue operation as a location anchor point based, at least in part, on an indication of an amount of time that said mobile device is to operate as a location anchor point.

* * * * *